United States Patent [19]

Kawamoto

[11] Patent Number: 5,580,707

[45] Date of Patent: *Dec. 3, 1996

[54] SILVER HALIDE PHOTOGRAPHIC MATERIAL

[75] Inventor: Fumio Kawamoto, Kanagawa, Japan

[73] Assignee: Fuji Photo Film Co., Ltd., Kanagawa, Japan

[*] Notice: The term of this patent shall not extend beyond the expiration date of Pat. No. 5,326,689.

[21] Appl. No.: 338,156

[22] Filed: Nov. 9, 1994

Related U.S. Application Data

[63] Continuation of Ser. No. 91,002, Jul. 13, 1993, abandoned.

[30] Foreign Application Priority Data

Jul. 14, 1992 [JP] Japan .................................. 4-208611
Jul. 14, 1992 [JP] Japan .................................. 4-208632

[51] Int. Cl.⁶ .............................. G03C 1/795; G03C 1/81
[52] U.S. Cl. ........................ 430/496; 430/531; 430/533; 430/501; 430/532; 430/930
[58] Field of Search .................................. 430/496, 531, 430/533, 501, 930, 532; 528/308, 308.2

[56] References Cited

U.S. PATENT DOCUMENTS

| | | |
|---|---|---|
| 3,939,000 | 2/1976 | Arvidson, Jr. et al. |
| 4,141,735 | 2/1979 | Schrader et al. .................. 430/531 |
| 5,215,825 | 6/1993 | Hiraoka et al. .................. 528/308 |
| 5,326,689 | 7/1994 | Murayama .................. 430/530 |
| 5,368,997 | 11/1994 | Kawamoto .................. 430/533 |
| 5,407,791 | 4/1995 | Kawamoto .................. 430/532 |
| 5,462,824 | 10/1995 | Kawamoto et al. .................. 430/533 |

FOREIGN PATENT DOCUMENTS 0496346  7/1992  European Pat. Off. .

OTHER PUBLICATIONS

Locey et al. Research Disclosure 15708 May, 1977.

Primary Examiner—Mark F. Huff
Attorney, Agent, or Firm—Sughrue, Mion, Zinn, Macpeak & Seas

[57] ABSTRACT

Disclosed is a silver halide photographic material of a roll film form having at least one light-sensitive layer on a polyester film support. The polyester film support has a glass transition point (Tg) from 90° C. to 200° C. and has been heat-treated at a temperature from 50° C. to its Tg. Also disclosed is a silver halide photographic material having at least one light-sensitive layer on a polyester film support, in which the polyester film support has a glass transition point from 90° C. to 200° C. and has been formed under the filming condition of a stretching temperature difference between the two surfaces of the film. The material is hardly curled even in the form of a roll film wound around a thin spool and has excellent mechanical characteristics.

15 Claims, 1 Drawing Sheet

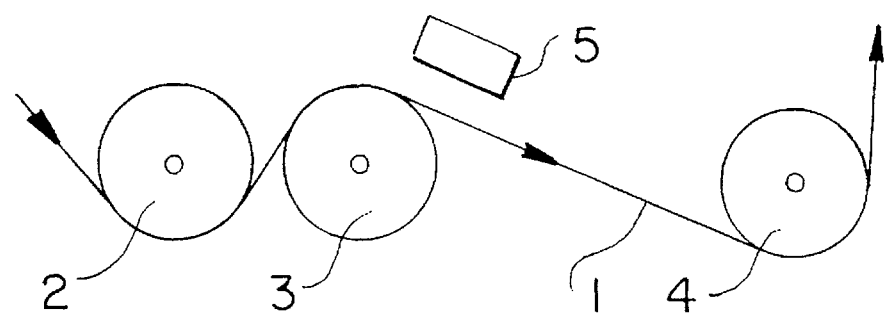

SILVER HALIDE PHOTOGRAPHIC MATERIAL

This is a continuation of application Ser. No. 08/091,002 filed Jul. 13, 1993 now abandoned.

FIELD OF THE INVENTION

The present invention relates to a silver halide photographic material and especially to a silver halide photographic material which has a heat-treated polyester film as its support and which hardly curls.

BACKGROUND OF THE INVENTION

In general, a photographic material is produced by coating at least one photographic layer on a plastic film support. The plastic film support generally employed is a cellulosic polymer such as triacetyl cellulose (hereinafter referred to as "TAC") or a polyester polymer such as polyethylene terephthalate (hereinafter referred to as "PET").

A photographic material is generally grouped into two forms: one being a sheet film such as an X-ray film, a film for photomechanical processes and a cut film, and the other being a roll film such as a color or black-and-white negative film having a width of 35 m/m or less. The latter is generally housed in a patrone (cartridge) and is charged in a camera for picture-taking.

As a support for a roll film, TAC is commonly used. The most characteristic features of TAC is that it has no optical anisotropy and has a high transparency. Another excellent characteristic is that TAC has an excellent property of easily smoothing the curl of a developed photographic material in which it is used as a support. Specifically, since a TAC film has a relatively high water-absorbing property (though being a plastic film) because of its characteristic molecular structure, the molecular chain of the film becomes fluid after the TAC support film has absorbed water during development of a curled roll film so that the molecular chain fixed in the curled roll film is rearranged.

As a result, TAC displays an excellent property of easily smoothing a curled roll film in which it comprises the support. However, a photographic material having a support without such an easily curl-smoothing property involves various problems, for example, scratching and out-of-focusing during the printing step of forming an image on a photographic printing paper from the developed roll film of the material and also jamming during feeding of the developed roll film of the material in the printing step.

On the other hand, since a PET film has excellent producibility, mechanical strength and dimensional stability, it has heretofore been considered to be substitutable for TAC. However, when the PET film is used as a support of a photographic material of the most popular roll film, it strongly curls and the curl of the film strongly remains even after development. As a result, the handling of the curled film is difficult and troublesome after development. Therefore, despite the above-mentioned excellent properties, the use of PET in the field of photographic materials has heretofore been limited.

For reducing the curling property of a polyester film, various attempts have heretofore been made. For instance, a method is described in JP-A-51-16358 (U.S. Pat. No. 4,141, 735) (the term "JP-A" as used herein means an "unexamined published Japanese patent application") in which a polyester film is heat-treated at a temperature lower than its glass transition temperature by 5° C. to 30° C.

The use of photographic materials is currently diversified widely, and the technology for rapid feeding photographic film in a camera or the like during picture-taking, elevation of image magnification, and reduction of the size of picture-taking devices has advanced noticeably. With this advanced technology, the support of photographic materials must have high strength and high dimensional stability and be as thin as possible.

In addition, with the great reduction of the size of picture-taking devices, the demand for reducing the size of film-housing cartridges has also become great. Heretofore, a 25 mm-diameter cartridge has been used in a 135 system picture-taking devices. In the case, therefore, where the size of the spool is reduced to 10 mm or less and additionally the thickness of the TAC support of the roll film to be charged in the current 135 system device is reduced from 122 μm to 90 μm, the size of the cartridge can be reduced to have a diameter of 20 mm or less. On the other hand, if the diameter of the spool is reduced to 3 mm or less, the roll film in the cartridge unfavorably suffers from pressure marks. Therefore, further reduction of the size of the spool below the described limit would be impossible.

Reduction of the size of a roll film cartridge involves two problems. The first problem is that the reduction of the thickness of the roll film to be in the cartridge is often accompanied by lowering of the mechanical strength of the film itself. In particular, the bending elasticity of a roll film decreases in proportion to the third power of the thickness thereof. A silver halide photographic material generally comprises a light-sensitive layer of a gelatin dispersion on a support, and the layer is shrunk under low humidity conditions to curl to a gutter-like form. The support is therefore needed to have a bending elasticity to be resistant to shrinking stress.

The second problem is that the roll film in a small-sized cartridge with a small-sized spool is strongly curled during storage of the film. In the conventional 135 system device, the smallest diameter of a roll film of 36 exposures housed in the cartridge is 14 mm. If the cartridge is desired to be smaller so that the diameter is 10 mm or less, the hardly smoothable curl of the roll film housed in the cartridge would be much greater causing various troubles in handling the exposed film. For instance, if the exposed film taken out of such a small-sized cartridge is developed in a mini-laboratory automatic developing machine, the film would be curled up during handling since only one edge of the film is fixed to the leader but the other one is not, so that feeding of a processing solution to the curled up area would be delayed to cause so-called "uneven development". In addition, the curled-up film would be crushed in the machine and the film being processed would then be "bent or broken".

SUMMARY OF THE INVENTION

Therefore, an object of the present invention is to provide a hardly curling photographic material having excellent mechanical characteristics.

This and other objects have been attained by a silver halide photographic material in a roll film form having at least one light-sensitive layer on a polyester film support. The polyester film support has a glass transition point (hereinafter referred to as "Tg") of from 90° C. to 200° C. and has been heat-treated at a temperature of from 50° C. to its Tg. These objects have also been attained by a silver halide photographic material having at least one light-sensitive layer on a polyester film support. The polyester film support has a glass transition point of from 90° C. to 200° C. The polyester film support has been formed under a filming condition in which there is a stretching temperature difference between the two surfaces of the film.

BRIEF EXPLANATION OF THE DRAWING

The drawing of the sole FIGURE shows a side view of a lengthwise stretching zone to be applied in the present invention, in which 1 is a film to be stretched, 2 and 3 are lengthwise stretching rollers, 4 is a cooling roller, and 5 is an infrared heater.

DETAILED DESCRIPTION OF THE INVENTION

The curling degree measuring method and the related terminologies referred to hereinafter are defined below.
(1) Core setting:
This is to wind a film around a spool for curling it.
(2) Core set curl:
This means the lengthwise direction curl of a film made by core setting. The curling degree is measured by test method A of ANSI/ASC PH1.29-1985 and is represented as 1/R (m) (where R indicates the radius of the curl).
(3) Absolute core set curl:
This indicates the core set curl of a photographic film to which no improvement in reducing the curl has been applied.
(4) Controlled core set curl:
This indicates the core set curl of a photographic film to which an improvement in reducing the curl has been applied.
(5) True core set curl:
This is represented by (absolute core set curl)—(controlled core set curl).
(6) Degree of reduction of curl:
This is represented by [(true core set curl)/(absolute core set curl)]×100
(7) Glass transition temperature (Tg):
Using a differential scanning colorimeter (DSC), 10 mg of a sample film is heated in a nitrogen stream at a rate of 20° C./min, a mathematical average temperature of the temperature at which the heated film begins to be shifted from its base line and the temperature at which it comes back to a new base line is obtained.

In one method TAC having a uncurling property is modified so as to improve its mechanical strength.

In another method a polyester support such as PET having an excellent mechanical strength is modified so that it is hardly curled.

However, when the method of JP-A-51-16358 is applied to a roll film wound around a conventional 135-cartridge having a large diameter of 14 mm and also to a roll film of the present invention wound around a small-sized cartridge having a small diameter of 10 mm, it has surprisingly been found that the degree of reduction of curl in the latter case having a small diameter of 10 mm is unexpectedly much larger than that in the former case of having a larger diameter of 14 mm. It has also been found that the degree of reduction of the curl decreases more with further reduction of the winding diameter of the cartridge for the roll film.

For attaining the intended effect, the support film is desired to be heat-treated at a possibly higher temperature for a possibly shorter period of time. But if the temperature for the heat treatment is higher than Tg of the film, the effect can not be attained. The effect is substantially noticeable when the temperature for the heat treatment is 50° C. or higher. Therefore, it is desired that the heat treatment is between 50° C. and the Tg of the treated film support.

The time for the heat treatment is effectively 0.1 hour or more. The longer the time, the better the effect. However, the effect is saturated when the heat treatment is effected for 1500 hours or more.

As mentioned above, the effect of the heat treatment could not be attained when it is carried out at a temperature higher than Tg of the support. Therefore, in view of users' common practice in which they often leave photographic film in a car which may have an inner temperature of about 90° C. in a summer season, the support is needed to have Tg of higher than 90° C.

The polyester support is preferable to have a Tg of from 90° C. to 200° C.

In the method disclosed in JP-A-51-16358, the inside structure of the film being heated is subjected to enthalpy relaxation. This reduces the free volume of the heat-treated film, so that the fluidity of the molecules of the film is inhibited and the film barely curls. However, in order to attain the sufficient effect, the film must be heat-treated at a temperature near the glass transition temperature for one day or more. Thus, the method had a drawback that it needs much time and much energy.

On the other hand, there is also known a method of JP-A-1-131550 where the inner structure of the base film is so modified that the film is curled to the direction opposite to the winding direction of the photographic material product having the base film whereby the time-dependent curl of the product to be made during its storage and the curl of the base film as forcedly made by the heat treatment are offset each other. In accordance with the method, a base film is subjected to a successive biaxial-stretching step under the condition of having a temperature gradation in the both surfaces of the film during the lengthwise stretching and the widthwise stretching. Where the method was employed, however, a sufficient uncurling effect could not be attained.

There are various kinds of such polyesters. In view of the balance between the hardly curling property and the high mechanical strength, preferred are polyesters consisting essentially of naphthalenedicarboxylic acid and ethylene glycol. Of them, especially preferred is polyethylene-2,6-naphthalenedicarboxylate (PEN).

The supports are preferable to have a thickness of from 50 µm to 300 µm. If the thickness is less than 50 µm, such a thin support could not be resistant to the shrinking stress of the photographic layer during drying. On the other hand, if it is more than 300 µm, such a thick film would be against the object of reducing the thickness of the film to obtain small-sized compact photographic materials.

The heat treatment must be effected at a temperature of from 50° C. to the glass transition temperature of the base film for a period of from 0.1 to 1500 hours. The higher the heat treatment temperature, the more the effect advances. If, however, the heat treatment temperature is higher than the glass transition temperature of the film, the molecules of the film heat-treated at such a high temperature would move randomly, to inversely increase the free volume of the film, with the result that the molecules of the thus heat-treated film would be more fluid and that the film would be more curlable. Because of these reasons, the heat treatment must be effected at a temperature not higher than the glass transition temperature of the film. On the other hand, if the temperature is lower than 50° C., the effect could advance only at an extremely slow speed so that the heat treatment requires too much time and is therefore not practical.

Therefore, the heat treatment is desirably effected at a temperature somewhat lower than the glass transition temperature of the film for the purpose of shortening the time for the treatment. Specifically, the temperature for the heat treatment is preferably from 50° C. to the glass transition temperature, more preferably from a temperature lower than the glass transition temperature by 30° C. up to the glass transition temperature.

On the other hand, where the heat treatment is effected under the temperature condition, the intended effect may be attained when the time for the treatment is 0.1 hour or more. However, if the time is more than 1500 hours, the effect would almost be saturated. Therefore, the time for the heat treatment is from 0.1 hour to 1500 hours.

The difference in temperature applied to the two sides of the film during stretching is from 10° C. to 100° C., more preferably from 10° C. to 30° C. If the temperature difference is less than 10° C., a sufficient difference in the structure between the surfaces of the heat-treated film could not be attained. The larger the temperature difference, the larger the curl of the heat-treated film. If, however, the temperature difference is substantially more than 100° C., the film would be crystallized too much so that it could not be transparent or it could not be stretched uniformly.

Polyesters having a glass transition temperature of falling of from 90° C. to 200° C. for use in the present invention are mentioned below.

Polyesters having a glass transition temperature of 90° C. or higher for use in the present invention are composed of a diol and a dicarboxylic acid. For instance, such polyesters may be obtained by polymerizing a dicarboxylic acid such as 2,6-naphthalenedicarboxylic acid (NDCA), terephthalic acid (TPA), isophthalic acid (IPA), orthophthalic acid (OPA), cyclohexanedicarboxylic acid (CHDC) or paraphenylenedicarboxylic acid (PPDC) and a diol such as ethylene glycol (EG), cyclohexane dimethanol (CHDM), neopentyl glycol (NPG), bisphenol A (BPA) or biphenol (BP) and optionally also a hydroxycarboxylic acid such as parahydroxybenzoic acid (PHBA) or 6-hydroxy-2-naphthalenecarboxylic acid (HNCA).

Of them, preferred are homopolymers or copolymers of naphthalene-dicarboxylic acid, terephthalic acid and ethylene glycol (in which the molar ratio of naphthalene-dicarboxylic acid to terephthalic acid is preferably from 0.3/0.7 to 1.0/0, more preferably from 0.5/0.5 to 0.8/0.2); homopolymers or copolymers of terephthalic acid, ethylene glycol and bisphenol A (in which the molar ratio of ethylene glycol to bisphenol A is preferably from 0.6/0.4 to 0/1.0, more preferably 0.5/0.5 to 0.1/0.9); homopolymers or copolymers of isophthalic acid, paraphenylene-dicarboxylic acid, terephthalic acid and ethylene glycol (in which the molar ratio of isophthalic acid to terephthalic acid and that of paraphenylene-dicarboxylic acid to the same are preferably from 0.1/1 to 10.0/1 and from 0.1/1 to 20/1, respectively, more preferably from 0.2/1 to 5.0/1 and from 0.2/1 to 10.0/1, respectively); homopolymers or copolymers of naphthalene-dicarboxylic acid, neopentyl glycol and ethylene glycol (in which the molar ratio of neopentyl glycol to ethylene glycol is preferably from 1/0 to 0.7/0.3, more preferably from 0.9/0.1 to 0.6/0.4); homopolymers or copolymers of terephthalic acid, ethylene glycol and biphenol (in which the molar ratio of ethylene glycol to biphenol is preferably from 0/1.0 to 0.8/0.2, more preferably from 0.1/0.9 to 0.7/0.3); and homopolymers or copolymers of parahydroxybenzoic acid, ethylene glycol and terephthalic acid (in which the molar ratio of parahydroxybenzoic acid to ethylene glycol is preferably from 1/0 to 0.1/0.9, more preferably from 0.9/0.1 to 0.2/0.8). Also suitable are polymer blends of, for example, PEN and PET (in which the ratio of the two is preferably from 0.3/0.7 to 1.0/0, more preferably from 0.5/0.5 to 0.8/0.2); and PET and PAr (in which the ratio of the two is preferably from 0.6/0.4 to 0/1.0, more preferably from 0.5/0.5 to 0.1/0.9).

Other dibasic acids of polyester components include phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarboxylic acid, tetrachlorophthalic anhydride, 3,6-endomethylene-tetrahydrophthalic anhydride, 1,4-cyclohexanedicarboxylic acid, and the following dibasic acids:

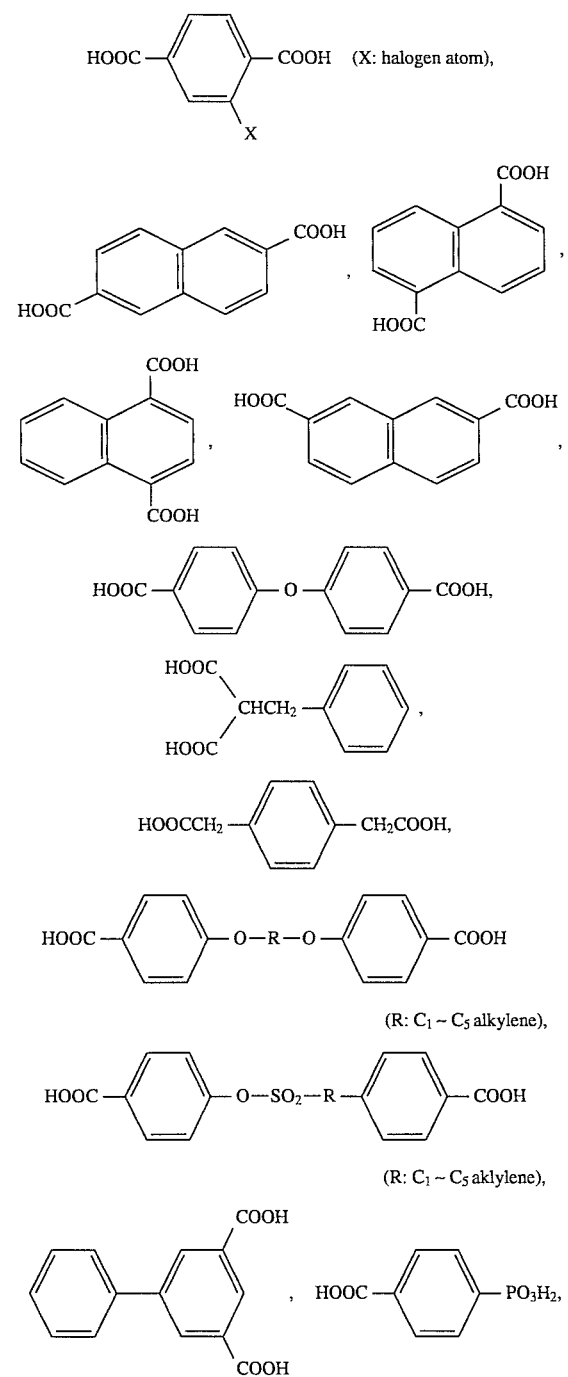

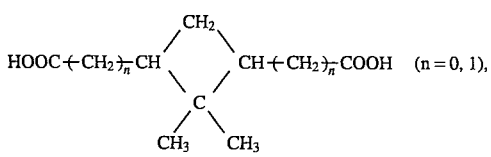

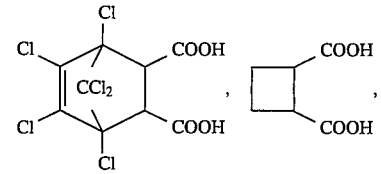

Other diols include 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,3-cyclohexanediol, 1,1-cyclohexane-dimethanol, catechol, resorcinol, hydroquinone, 1,4-benzene-dimethanol and the following diols:

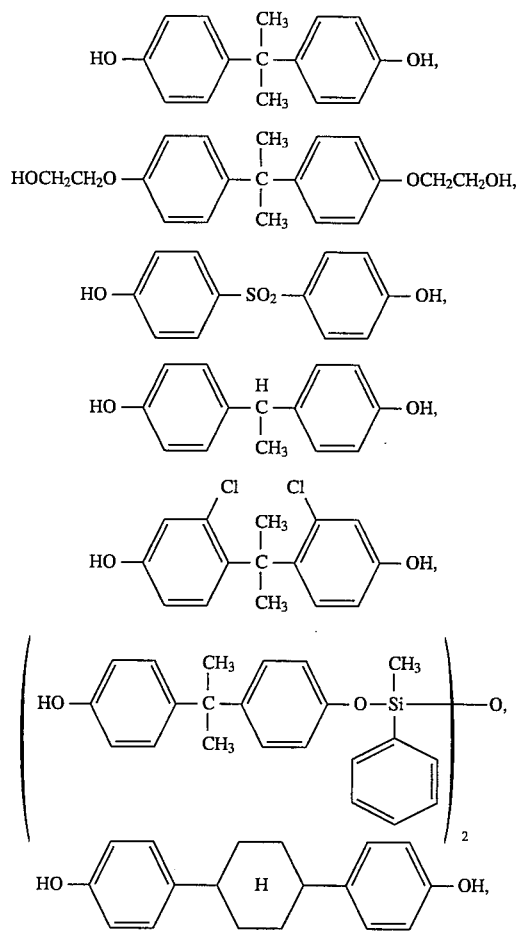

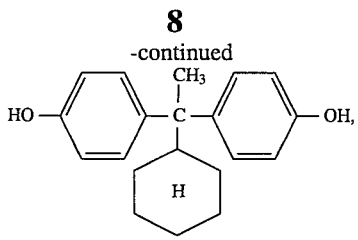

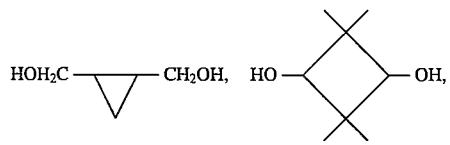

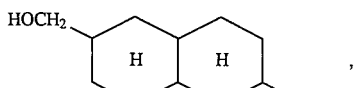

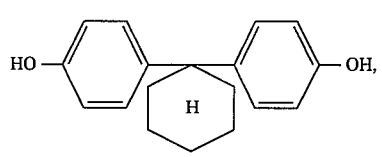

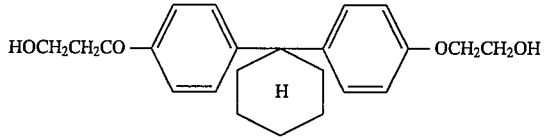

If desired, copolyesters containing additional comonomers of mono-functional or tri- or more polyfunctional hydroxyl group-containing compounds or acid-containing compounds may also be used in the present invention.

Also suitable in the present invention are copolyesters containing additional comonomers of compounds having both hydroxyl group(s) and carboxyl (or its ester) group(s) in the molecule.

Examples of such comonomers include the following compounds: Homopolymers:

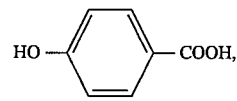

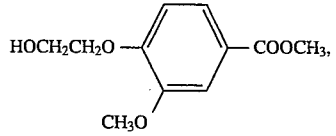

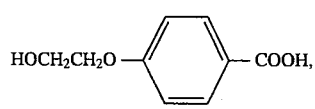

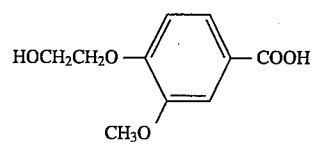

Preferred examples of polyesters for use in the present invention are mentioned below:

| PEN: | [2,6-naphthalene-dicarboxylic acid (NDCA)/ethylene glycol (EG) (100/100)] | Tg = 119° C. |
|---|---|---|
| PCT: | [terephthalic acid (TPA)/cyclohexane dimethanol (CHDM) (100/100)] | Tg = 93° C. |
| PAr: | [TPA/bisphenol A (BPA) (100/100)] | Tg = 192° C. |

Copolymers (the parenthesized ratio is by mol):

| PBC-1: | 2,6-NDCA/TPA/EG (50/50/100) | Tg = 92° C. |
|---|---|---|
| PBC-2: | 2,6-NDCA/TPA/EG (75/25/100) | Tg = 102° C. |
| PBC-3: | 2,6-NDCA/TPA/EG/BPA (50/50/75/25) | Tg = 112° C. |
| PBC-4: | TPA/EG/BPA (100/50/50) | Tg = 105° C. |
| PBC-5: | TPA/EG/BPA (100/25/75) | Tg = 135° C. |
| PBC-6: | TPA/EG/CHDM/BPA (100/25/25/50) | Tg = 115° C. |
| PBC-7: | IPA/PPDC/TPA/EG (20/50/30/100) | Tg = 95° C. |
| PBC-8: | NDCA/NPG/EG (100/70/30) | Tg = 105° C. |
| PBC-9: | TPA/EG/BP (100/20/80) | Tg = 115° C. |
| PBC-10: | PHBA/EG/TPA (200/100/100) | Tg = 125° C. |

Polymer Blends (the parenthesized ratio is by weight):

| PBB-1: | PEN/PET (60/40) | Tg = 95° C. |
|---|---|---|
| PBB-2: | PEN/PET (80/20) | Tg = 104° C. |
| PBB-3: | PAr/PEN (50/50) | Tg = 142° C. |
| PBB-4: | PAr/PCT (50/50) | Tg = 118° C. |
| PBB-5: | PAr/PET (60/40) | Tg = 101° C. |
| PBB-6: | PEN/PET/PAr (50/25/25) | Tg = 108° C. |

Of the above-mentioned polyesters, PEN has the most-balanced properties. Specifically, it has a high mechanical strength, especially a high modulus of elasticity, and has a sufficiently high glass transition temperature of about 120° C. Using it, the necessary thickness of the base film may be reduced to 80 μm as compared with that of TAC being 122 μm. However, this has the drawback of being fluorescent. On the other hand, PCT has a high mechanical strength and a high glass transition temperature of about 110° C. However, this has the drawback of being hardly transparent since its crystallization speed is extremely high. PAr has the highest glass transition temperature (190° C.) among them, but it has the drawback of having a lower mechanical strength than PET. Therefore, in order to compensate the drawbacks, blends of these polymers or copolymers of them may be employed.

These homopolymers and copolymers may be produced by conventional methods of producing ordinary polyesters. For instance, an acid component and a glycol component are directly esterified; or if a dialkyl ester is used as an acid component, it is first interesterfied with a glycol component and the resulting product is then heated under reduced pressure to remove the excess glycol component. Alternatively, an acid halide is used as an acid component and this may be reacted with a glycol component. In the case, interesterification, addition of a catalyst or polymerization catalyst or addition of a heat-resistant stabilizer may be employed, if desired. Regarding the polyester producing methods, for example, the descriptions in *Studies of Polymer Experiments*, Vol. 5 "Polycondensation and Addition Polymerization" (published by Kyoritsu Publishing Co., 1980), pp. 103–136; and *Synthetic Polymers V* (published by Asakura Shoten KK, 1971), pp. 187–286, may be referred to.

The polyesters for use in the present invention preferably have a mean molecular weight of approximately from 10,000 to 500,000.

Polymer blends of such polymers may easily be formed in accordance with the methods described in JP-A-49-5482, JP-A-64-4325, JP-A-3-192718, and *Research Disclosure* 283739–41, 284779–82 and 294807–14.

The silver halide photographic material of the present invention is desired to be wound around a spool having a diameter of from 3 mm to 10 mm.

The polymer film of the present invention may contain an ultraviolet absorbent for the purpose of anti-fluorescence and of stabilization during storage, by kneading the absorbent into the film. As the ultraviolet absorbent, preferred are those which do not absorb visible rays. The amount of the absorbent in the polymer film is generally approximately from 0.5% by weight to 20% by weight, preferably approximately from 1% by weight to 10% by weight. If it is less than 0.5% by weight, the ultraviolet-absorbing effect of the film would be insufficient. Preferred examples of the ultraviolet absorbent include benzophenone compounds such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone, and 2,2'-dihydroxy-4,4'-dimethoxybenzophenone; benzotriazole compounds such as 2-(2'-hydroxy-5-methylphenyl)benzotriazole, 2-(2'-hydroxy-3',5'-di-t-butylphenyl)benzotriazole, and 2-(2'-hydroxy-3'-di-t-butyl-5'-methylphenyl)benzotriazole; and salicylic acid compounds such as phenyl salicylate and methyl salicylate.

Use of a polyester film as a support of a photographic material involves the problem that the support causes light-piping due to its high refractive index.

Polyesters, especially aromatic polyesters, have a high refractive index of from 1.6 to 1.7; while gelatin, which is an essential component of a light-sensitive layer to be coated over the polyester base film, has a lower refractive index of from 1.50 to 1.55. Therefore, where light has been introduced into the film from its edge, it easily reflects on the interface between the base and the emulsion layer. Because of this, a polyester film causes a so-called light-piping phenomenon.

For avoiding such a light-piping phenomenon, it is known to incorporate inactive inorganic grains or the like into the film and to add a dye thereto. A method of adding a dye, which does not noticeably increase film haze, to the polyester film of the present invention is preferably employed in the invention for avoiding light-piping of the film.

The dye to be used for coloring the film for this purpose is not specifically limited. Preferred is gray coloring of the film in view of the general properties of photographic materials. For this purpose, therefore, preferred are dyes having excellent heat resistance in the temperature range for filming the polyester film and having excellent compatibility with polyesters.

In view of the above-mentioned points, the intended object may be attained by adding commercial dyes of Mitsubishi Kasei's Diaresin or Nippon Chemical's Kayaset, which are sold as dyes for polyesters, to the polyester film of the present invention.

The coloring density due to addition of such dyes is needed to be at least 0.01 or more, more preferably 0.03 or more, as a visible color density measured with a Mackbeth's color densitometer.

The polyester film of the present invention may be treated to be lubricative. The means for making the film lubricative is not specifically limited. For instance, generally employable is a method of kneading an inactive inorganic compound into the film or a method of coating a surfactant over the film.

Inactive inorganic grains suitable for this purpose include $SiO_2$, $TiO_2$, $BaSO_4$, $CaCO_3$, talc, kaolin and the like. In addition to the method of adding inactive grains to the polyester producing reaction system for making the resulting polyester film lubricative due to the added grains, one may also employ the method of precipitating the catalyst or the like, which is to be added to the polymerization reaction system of producing polyesters, in the resulting polyester film so as to make the film lubricative due to precipitation of the internal grains.

In any event, the means of making the polyester film lubricative is not specifically limited. However, since the support of a photographic material must be transparent as its important characteristic, the grains to be added to the polyester by the former method are desired to be selectively $SiO_2$ grains which have a refractive index relatively near to that of the polyester film, and the internal grains to be precipitated in the polyester film are desired to be selectively those having a relatively small grain size.

Where the polyester film is made lubricative by a grains-kneading means, a method of laminating a functional layer over the film is also preferably employed so as to elevate greatly the transparency of the film. Examples of the method include co-extrusion with plural extruders and feed blocks and also co-extrusion with multi-manifold dies.

The filming method of forming the polyester film of the present invention, which is carried out under the condition of a temperature difference between the two surfaces of the film is mentioned below.

Specifically, for example, an auxiliary heating means such as an infrared heater or the like is applied to one surface or to both surfaces of the film during stretching the cast film to a specific extension in its lengthwise direction, whereby the stretching temperatures of both surfaces of the film are made different from each other so that the curl of the film that persists after the curled film has been uncurled or smoothed may well be controlled.

The sole FIGURE shows a side view of a lengthwise stretching zone used for stretching the polyester film in accordance with the constitution of the present invention.

In the embodiment of the figure, a cast film (1) is heated with lengthwise stretching rollers (2) and (3) and then conveyed to a widthwise stretching zone (not shown) via a cooling roller (4). Just after the stretching roller (3), an infrared heater (5) is disposed. By the illustrated arrangement, the temperature difference between the two surfaces of the film just after the infrared heater may be made to fall within the range of from 10° to 100° C., more preferably from 10° to 30° C., whereby the degree of the curl of the stretched film may effectively be controlled.

The curl controlling mechanism of the present invention is considered to essentially reside in the difference in the degree of crystallinity and of orientation between the two surfaces of the film to result in a difference in the degree of shrinkage of the volume of the film in the heat treatment step.

Precisely, the crystals constituting the film grow more easily to elevate the density of the film on its lower temperature side rather than in its higher temperature side to thereby cause shrinkage of the volume of the film. Accordingly, the film is to have a permanent curl in that it curls towards its lower temperature side being inside. The difference may be analyzed by X-ray diffraction of one surface of the film.

The filming step is not specifically limited. One preferred example applicable to the present invention is a successive biaxially stretching method where the cast film is first stretched to a determined extension in its lengthwise direction and then stretched with a tenter in its widthwise direction. The method is explained below.

Crystallization of the film occurs throughout the all steps from the casting step to the lengthwise and widthwise stretching steps. Therefore, the step for attaining the difference in the degree of crystallinity between the two surfaces of the film may be effected during the casting step, the lengthwise stretching step and/or the widthwise stretching step.

It is advantageous to perform the step in which this difference is attained, during the casting step. This is true because the thickness of the film is largest during the casting step, so that the difference in temperature between the two films may be easily attained. However, fine crystals may grow in the film, depending upon the reaction conditions, with the result that a film having such fine crystals would be unsuitable as a photographic support because of its optical and mechanical properties. Alternatively, the difference between the formed crystals may result in a difference in the degree of isothermal crystallinity of the film, so that the crystals constituting the film are often destroyed in a subsequent stretching step. This is bad because it would then be impossible to control curl.

As opposed to this, a difference in the degree of crystallinity of the film obtained in the stretching step may result in a difference in the degree of the oriented crystallinity of the same so that the crystals are hardly destroyed. In addition, the stretching zone is generally provided with heating and cooling means and addition of any additional auxiliary heating means is easy. Because of these reasons, the method of the present invention is more preferably applied to the stretching step.

Comparing the lengthwise stretching step and the widthwise stretching step, the latter enlarges the area of the film several times and therefore inevitably needs large-scaled equipment.

Accordingly, in the above-mentioned successive biaxially stretching process, it is most suitable to yield a difference in the degree of crystallinity between the two surfaces of the film in the lengthwise stretching step.

Where the polymer film of the present invention is used as a support of a photographic material, it is extremely difficult to firmly stick photographic materials (such as light-sensitive silver halide emulsion layer, interlayer, filter layer, etc.) each having a protective colloid consisting essentially of gelatin on the support, since the polymer film has hydrophobic surfaces. The conventional technology for overcoming this problem includes, for example, the following two means:

(1) a method of previously activating the surface of the film to be coated with photographic layers by chemical treatment, mechanical treatment, corona-discharging treatment, flame treatment, ultraviolet ray treatment, high frequency treatment, glow-discharging treatment, active plasma treatment, laser treatment, mixed acid treatment, ozone oxidation treatment or the like, followed by direct coating of the thus activated surface with a photographic emulsion, whereby the adhesion between the surface of the support and the coated layer is elevated; and (2) a method of forming a subbing layer after the above-mentioned surface treatment or without the treatment, followed by coating a photographic emulsion layer over the subbing layer (for instance, refer to U.S. Pat. Nos. 2,698,241, 2,764,520, 2,864,755, 3,462,335, 3,475,193, 3,143,421, 3,501,301, 3,460,944, 3,674,531, British Patents 788,365, 804,005, 891,469, and JP-B-48-43122, JP-B-51-446; the term "JP-B" as used herein means an "examined Japanese patent publication".)

The surface treatment of the support is believed to create more or less polar groups on its surface which has been originally hydrophobic or to increase the crosslinking density of its surface. As a result of the surface treatment, it is also believed that the affinity of the film for the polar groups of the components contained in the subbing layer increases or the fastness of the adhesive surface of the film increases. Various modifications of the constitution of the subbing layer have been made. For instance, a first layer which adheres well to the support (hereinafter referred to as a first subbing layer) is provided and a second hydrophilic resin layer which adheres well to a photographic layer (hereinafter referred to as a second subbing layer) is then coated over the first layer by a so-called multi-layer lamination method. Alternatively, only one resin layer having both hydrophobic and hydrophilic groups is coated on the support by a single layer coating method.

Of the surface treatments of method (1), corona-discharging treatment is the most popular method. It may be effected by any known means such as those disclosed in JP-B-48-5043, JP-B-47-51905, JP-A-47-28067, JP-A-49-83767, JP-A-51-41770, JP-A-51-131576, etc. The discharging frequency for the treatment may be from 50 Hz to 5000 kHz, preferably from 5 kHz to several hundred kHz. If the discharging frequency is too small, stable discharging could not be attained so that the treated surface unfavorably has pin holes. If, however, it is too large, the treatment unfavorably needs a particularly expensive device for impedance matching. The strength of the treatment is suitably from 0.001 KV.A.min/m$^2$ to 5 KV.A.min/m$^2$, preferably from 0.01 KV.A.min/m$^2$ to 1 KV.A.min/m$^2$, for improving the wettability of common plastic films such as polyester or polyolefin films. The gap clearance between the electrode and the dielectric roll may be from 0.5 to 2.5 mm, preferably from 1.0 to 2.0 mm.

Glow-discharging treatment is the most effective surface treatment for many supports and it may be effected by any known means such as those described in JP-B-35-7578, JP-B-36-10336, JP-B-45-22004, JP-B-45-22005, JP-B-45-24040, JP-B-46-43480, U.S. Pat. Nos. 3,057,792, 3,057,795, 3,179,482, 3,288,638, 3,309,299, 3,434,735, 3,462,335, 3,475,307, 3,761,299, British Patent 997,093, and JP-A-53-129262.

Regarding the pressure condition for glow-discharging treatment, it may be generally from 0.005 to 20 Torr, preferably from 0.02 to 2 Torr. If the pressure is too low, the surface-treating effect by the treatment would lower. However, if it is too high, such a high pressure would yield a too large current flow to cause sparking dangerously and the treated support would be destroyed. The discharging is yielded by applying a high voltage to a pair or more of metal plates or metal rods as disposed with a distance therebetween in a vacuum tank. The voltage may be varied, depending upon the composition and pressure of the ambient vapor. In general, it may be between 500 V and 5000 V to yield stable constant glow discharging under the pressure of falling within the above-mentioned range. The especially preferred voltage range for improving the adhesiveness of the surface of he support is between 2000 V and 4000 V.

The discharging frequency may be from a direct current to several thousand MHZ, preferably from 50 Hz to 20 MHz, as is taught by the art. The discharging strength may be from 0.01 KV.A.min/m$^2$ to 5 KV.A.min/m$^2$, preferably from 0.15 KV.A.min/m$^2$ to 1 KV.A.min/m$^2$, to obtain the intended adhesiveness.

Subbing layer coating method (2) is explained below. For the first subbing layer to be formed in the multi-layer coating method, the characteristics of many polymers such as copolymers composed of, for example, monomers selected from vinyl chloride, vinylidene chloride, butadiene, methacrylic acid, acrylic acid, itaconic acid and maleic acid, as well as polyethylene-imine, epoxy resins, grafted gelatins, nitrocellulose and other polymers have been studied; and for the second subbing layer to be formed in the same, those of gelatin have been studied essentially.

In many cases of the single layer coating method, the support is first swollen and thereafter a hydrophilic polymer for the subbing layer is applied to the swollen support for interfacial mixing, whereby the adhesiveness of the support is elevated.

Examples of the polymer for the subbing layer employable in the present invention include water-soluble polymers, cellulose esters, latex polymers and water-soluble polyesters. Suitable water-soluble polymers include, for example, gelatin, gelatin derivatives, casein, agar, sodium alginate, starch, polyvinyl alcohol, polyacrylic acid copolymers, maleic anhydride copolymers and others. Suitable cellulose esters include, for example, carboxymethyl cellulose, hydroxyethyl cellulose and others. Suitable latex polymers include, for example, vinyl chloride-containing copolymers, vinylidene chloride-containing copolymers, acrylate-containing copolymers, vinyl acetate-containing copolymers, butadiene-containing copolymers and others. Of them, gelatin is the most preferred.

The compounds to be used for swelling the support in the present invention include, for example, resorcinol, chlororesorcinol, methylresorcinol, o-cresol, m-cresol, p-cresol, phenol, o-chlorophenol, p-chlorophenol, dichlorophenol, trichlorophenol, monochloroacetic acid, dichloroacetic acid, trifluoroacetic acid, chloral hydrate and others. Of them, preferred are resorcinol and p-chlorophenol.

The subbing layer of the present invention may contain various gelatin hardening agents. Suitable gelatin hardening agents include, for example, chromium salts (chromium alum, etc.), aldehydes (formaldehyde, glutaraldehyde, etc.), isocyanates, active halogen compounds (2,4-dichloro-6-hydroxy-s-triazine, etc.), epichlorohydrin resins and others.

The subbing layer of the present invention may contain fine inorganic grains such as $SiO_2$, $TiO_2$ or mat agent or fine grains (having a grain size of from 1 to 10 μm) of polymethyl methacrylate copolymers.

In addition to them, other various additives may be added to the subbing layer, if desired. For instance, the layer may contain a surfactant, an antistatic agent, an anti-halation agent, a coloring dye, a pigment, a coating aid, an anti-foggant and others. Where a first subbing layer is formed on the support of the present invention, it is quite unnecessary to incorporate an etching agent such as resorcinol, chloral hydrate or chlorophenol into the coating liquid. If desired, however, such an etching agent may of course be incorporated into the subbing layer coating liquid with no problem.

The subbing layer coating liquid may be coated on the support by any well-known method, for example, by dip-coating, air knife-coating, curtain-coating, roller-coating, wire bar-coating, gravure-coating, or by the extrusion coating method of using a hopper as described in U.S. Pat. No. 2,681,294. If desired, two or more layers may be coated simultaneously by the methods described in U.S. Pat. Nos. 2,761,791, 3,508,947, 2,941,898 and 3,526,528 and in Y. Harada, *Coating Engineering*, page 253 (published by Asakura Shoten KK, 1973).

The binder of the backing layer optionally coated on the support of the present invention may be either a hydrophobic polymer or a hydrophilic polymer such as that in the subbing layer.

The backing layer may contain an antistatic agent, a lubricant agent, a mat agent, a surfactant, a dye and others.

The antistatic agent in the backing layer is not specifically limited. For instance, it includes anionic polyelectrolytes of polymers containing carboxylic acids, carboxylic acid salts or sulfonic acid salts, such as those described in JP-A-48-22017, JP-B-46-24159, JP-A-51-30725, JP-A-51-129216 and JP-A-55-95942; and cationic polymers, such as those described in JP-A-49-121523, JP-A-48-91165 and JP-B-49-24582. The ionic surfactant in the layer may be either anionic or cationic. For instance, the compounds described in JP-A-49-85826, JP-A-49-33630, U.S. Pat. Nos. 2,992,108, 3,206,312, JP-A-48-87826, JP-B-49-11567, JP-B-49-11568 and JP-A-55-70837 are suitable.

The most preferred antistatic agent in the backing layer of the present invention is fine grains of at least one crystalline metal oxide selected from ZnO, $TiO_3$, $SnO_2$, $Al_2O_3$, $In_2O_3$, $SiO_2$, MgO, BaO and $MoO_3$ or a metal composite of them.

The fine grains of the conductive crystalline oxide or composite oxide used in the present invention have a volume resistivity of $10^7$ Ωcm or less, more preferably $10^5$ Ωcm or less. The grain size thereof is desirably from 0.01 to 0.7 μ, especially preferably from 0.02 to 0.5 μ.

Methods of producing the fine grains of the conductive crystalline metal oxide or composite oxide for the present invention are described in, for example, JP-A-56-143430 and JP-A-60-258541. Examples of easy methods include a method of forming fine grains of a metal oxide by firing followed by heat-treating them in the presence of hetero atom(s) so as to elevate the conductivity of the grains; a method of forming fine grains of a metal oxide by firing in the presence of hetero atom(s) having the function of elevating the conductivity of the grains; and a method of forming fine grains of a metal oxide by firing with lowered oxygen concentration in the firing atmosphere so as to introduce oxygen defects into the grains. Examples of the hetero atoms to be introduced into the fine grains include Al, In and the like into ZnO; Nb, Ta and the like into $TiO_2$; and Sb, Nb, halogen elements and the like into $SnO_2$. The amount of the hetero atoms to be added is preferably from 0.01 to 30 mol %, especially preferably from 0.1 to 10 mol %.

The photographic layers constituting the photographic material of the present invention are described below.

The silver halide emulsion layer may be either a black-and-white layer or a color layer. As one example, a color silver halide photographic material is referred to hereinafter.

The photographic material may have at least one silver halide emulsion layer of a blue-sensitive layer, a green-sensitive layer and a red-sensitive layer. The number of silver halide emulsion layers and non-light-sensitive emulsion layers and their sequence are not specifically limited. One typical example is a silver halide photographic material having at least one light-sensitive layer composed of a plurality of silver halide emulsion layers each having substantially the same color sensitivity but having a different sensitivity degree. The light-sensitive layer is a light-sensitive layer unit sensitive to any of blue light, green light and red light. In the case of a multi-layer silver halide color photographic material, in general, the sequence of the unit light-sensitive layers is such that a red-sensitive layer, a green-sensitive layer and a blue-sensitive layer are formed on the support in this order. However, the sequence may be reversed or modified or a different color-sensitive layer may be sandwiched between two of the same color-sensitive layers, in accordance with the object of the photographic material.

Non-light-sensitive layers such as an interlayer may be provided between the silver halide light-sensitive layers or as an uppermost layer or a lowermost layer.

The interlayer may contain couplers, DIR compounds and the like, such as those described in JP-A-61-43748, JP-A-59-113438, JP-A-59-113440, JP-A-61-20037 and JP-A-61-20038, and it may also contain an ordinary color mixing preventing agent.

The plurality of silver halide emulsion layers constituting the individual unit light-sensitive layer are described in, for example, German Patent 1,121,470, British Patent 923,045, JP-A-57-113751, JP-A-62-200350, JP-A-62-206541, JP-A-62-206543, JP-A-56-25738, JP-A-62-63936, JP-A-59-202464, JP-B-55-34932 and JP-B-49-15495.

Silver halide grains constituting the emulsion layer may be regular crystalline grains such as cubic, octahedral or tetradecahedral grains or irregular crystalline grains such as spherical or tabular grains. They may also be grains having crystal defects such as a twin plane. They may also have a composite form.

Regarding the grain size of the silver halide grains, they may be fine grains having a grain size of about 0.2 microns or less or large grains having a grain size of up to about 10 microns as the diameter of the projected area. The emulsion may be either a polydispersed emulsion or a monodispersed emulsion.

The silver halide photographic emulsion to be used in the present invention may be prepared, for example, by the methods described in *Research Disclosure* (RD) No. 17643 (December, 1978), pp. 22–23, "I. Emulsion Preparation and Types"; ibid., No. 18716 (November, 1979), p. 648; P. Glafkides, *Chemie et Physique Photographique*, (by Paul Montel, 1967); G. F. Duffin, *Photographic Emulsion Chemistry* (by Focal Press, 1966); V. L. Zelikman et al., *Making and Coating Photographic Emulsion* (by Focal Press, 1964) and others.

The monodispersed emulsions described in U.S. Pat. Nos. 3,574,628, 3,655,394 and British Patent 1,413,748 are also preferably employed in the present invention.

Tabular silver halide grains having an aspect ratio of about 5 or more may also be employed in the present invention. Such tabular grains may be easily prepared, for example, by the methods described in Gutoff, *Photographic Science and Engineering*, Vol. 14, pp. 248–257 (1970); and U.S. Pat. Nos. 4,434,226, 4,414,310, 4,438,048 and 4,439,520 and British Patent 2,112,157.

Regarding the crystal structure of the silver halide grains constituting the emulsions of the invention, the grains may have the same halogen composition throughout the whole grain, or they may have different halogen compositions between the inside part and the outside part of one grain, or they may have a layered structure. Further, the grains may have different halogen compositions conjugated by epitaxial junction, or they may have components other than silver halides, such as silver rhodanide or lead oxide, conjugated with the silver halide matrix. Additionally, a mixture of various grains of different crystalline forms may be employed in the present invention.

The silver halide emulsions for use in the invention are generally physically ripened, chemically ripened and/or color-sensitized. The effect of the present invention is especially noticeable, when emulsions are sensitized with gold compounds and sulfur-containing compounds. Additives to be used in such a ripening or sensitizing step are described in *Research Disclosure* Nos. 17643 and 18716, and the related descriptions in these references are shown in the table mentioned below.

Various other known photographic additives which may be used in preparing the photographic materials of the present invention are mentioned in the above-mentioned two Research Disclosures, and the related descriptions therein are shown in the following table.

| Kinds of Additives | RD 17643 | RD 18716 |
|---|---|---|
| 1. Chemical Sensitizer | page 23 | page 648, right column |
| 2. Sensitivity Enhancer | | page 648, right column |
| 3. Color Sensitizing Agent Super Color Sensitizing Agent | pages 23 to 24 | page 648, right column, to page 649, right column |
| 4. Brightening Agent | page 24 | |
| 5. Anti-foggant Stabilizer | pages 24 to 25 | page 649, right column |
| 6. Light Absorbent Filter Dye Ultraviolet Absorbent | pages 25 to 26 | page 649, right column to page 650, left column |
| 7. Stain inhibitor | page 25, right column | page 650, left column to right column |
| 8. Color Image Stabilizer | page 25 | |
| 9. Hardening Agent | page 26 | page 651, left column |
| 10. Binder | page 26 | page 651, left column |
| 11. Plasticizer, Lubricant | page 27 | page 650, right column |
| 12. Coating Aid Surfactant | pages 26 to 27 pages 26 to 27 | page 650, right column page 650, right column |

In order to prevent deterioration of the photographic property of the photographic material of the invention by formaldehyde gas imparted thereto, compounds capable of reacting with formaldehyde so as to solidify it, for example, those described in U.S. Pat. Nos. 4,411,987 and 4,435,503, are preferably incorporated into the material.

Various color couplers can be incorporated into the photographic material of the present invention, and suitable examples of color couplers are described in patent publications referred to in the above-mentioned RD No. 17643, VII-C to G.

Preferred yellow couplers are, for example, those described in U.S. Pat. Nos. 3,933,501, 4,022,620, 4,326,024, 4,401,752 and 4,248,961, JP-B-58-10739, British Patents 1,425,020 and 1,476,760, U.S. Pat. Nos. 3,973,968, 4,314, 023 and 4,511,649, and EP-A-249473.

Preferred magenta couplers and 5-pyrazolone compounds and pyrazoloazole compounds. For instance, those described in U.S. Pat. Nos. 4,310,619 and 4,351,897, European Patent 73,636, U.S. Pat. Nos. 3,061,432 and 3,725,045, RD No. 24220 (June, 1984), JP-A-60-33552, RD No. 24230 (June, 1984), JP-A-60-43659, JP-A-61-72238, JP-A-60-35730, JP-A-55-118034 and JP-A-60-185951, U.S. Pat. Nos. 4,500, 630, 4,540,654 and 4,556,630, and WO(PCT)-88/04795 are especially preferred.

The cyan couplers include phenol couplers and naphthol couplers. Preferred are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,178, German Patent Laid-Open No. 3,329,729, EP-A-121365, EP-A-249453, U.S. Pat. Nos. 3,446,622, 4,333,999, 4,753,871, 4,451,559, 4,427,767, 4,690,889, 4,254,212 and 4,296,199, and JP-A-61-42658.

Preferred colored couplers for correcting the unnecessary absorption of colored dyes are described in RD No. 17643, VII-G, U.S. Pat. No. 4,163,670, JP-B-57-39413, U.S. Pat. Nos. 4,004,929 and 4,138,258, and British Patent 1,146,368.

Couplers capable of forming a colored dye having a pertinent diffusibility may also be used, and those described in U.S. Pat. No. 4,366,237, British Patent 2,125,570, European Patent 96,570, and German Patent OLS No. 3,234,533 are preferred.

Polymerized dye-forming couplers may also be used, and typical examples of such couplers are described in U.S. Pat. Nos. 3,451,820, 4,080,211, 4,367,282, 4,409,320 and 4,576, 910, and British Patent 2,102,137.

Couplers capable of releasing a photographically useful residue along with coupling may also be used in the present invention. For instance, DIR couplers capable of releasing a development inhibitor are described in the patent publications referred to in the above-mentioned RD No. 17643, Item VII-F. Those described in JP-A-57-151944, JP-A-57-154234, JP-A-60-184248, JP-A-63-37346 and U.S. Pat. No. 4,248,962 are preferred.

Preferred couplers capable of imagewise releasing a nucleating agent or development accelerator during development are described in British Patents 2,097,140 and 2,131,188, and JP-A-59-157638 and JP-A-59-170840.

Additionally, examples of other couplers which may be incorporated into the photographic materials of the present invention include: competing couplers described in U.S. Pat. No. 4,130,427; poly-valent couplers described in U.S. Pat. Nos. 4,238,472, 4,338,393 and 4,310,618; DIR redox compound-releasing couplers, DIR coupler-releasing couplers, DIR coupler-releasing redox compounds and DIR redox-releasing redox compounds described in JP-A-60-185950 and JP-A-62-24252; couplers capable of releasing a dye which recolors after being released from the coupler, as described in EP-A-173302; bleaching accelerators-releasing couplers described in RD Nos. 11449 and 24241, and JP-A-61-201247; ligand-releasing couplers described in U.S. Pat. No. 4,553,477; and leuco dye-releasing couplers described in JP-A-63-75747.

The above-mentioned couplers can be incorporated into the photographic materials of the present invention by various known dispersion methods.

Examples of high boiling point solvents used in an oil-in-water dispersion method are disclosed in U.S. Pat. No. 2,332,027. Examples of suitable high boiling point solvents having a boiling point of 175° C. or higher at normal pressure include phthalates, phosphates, phosphonates, benzoates, amides, alcohols, phenols, aliphatic carboxylates, aniline derivatives and hydrocarbons. Examples of auxiliary solvents which are also usable in the method include organic solvents having a boiling point of approximately from 30° C. to 160° C., preferably approximately from 50° C. to 160° C. Specific examples are ethyl acetate, butyl acetate, ethyl propionate, methyl ethyl ketone, cyclohexanone, 2-ethoxyethyl acetate and dimethylformamide.

A latex dispersion method may also be employed for incorporating couplers into the photographic material of the present invention. The steps of carrying out the dispersion method, the effect of the method and examples of latexes suitable for the method for impregnation are described in U.S. Pat. No. 4,199,363, German Patent (OLS) Nos. 2,541, 274 and 2,541,230.

It is desired that the total film thickness of all the hydrophilic colloid layers having emulsion layers provided on the surface of the support is 28 microns or less, in the photographic material of the present invention. It is also desired that the photographic material of the invention has a film swelling rate (T ½) of 30 seconds or less. The film thickness referred to herein is one measured under the controlled conditions of a temperature of 25° C. and a relative humidity of 55% (for 2 days); and the film swelling rate referred to herein may be measured by any means known in this technical field. For instance, it may be measured by the use of a swellometer of the model described in A. Green et al., *Photographic Science Engineering*, Vol. 19, No. 2, pages 124 to 129. The film swelling rate (T ½) is defined as follows: 90% of the maximum swollen thickness of the photographic material as processed in a color developer under the conditions of 30° C. and 3 minutes and 15 seconds is called a saturated swollen thickness. The time necessary for attaining a half (½) of the saturated swollen thickness is defined to be the film swelling rate (T ½).

The film swelling rate (T ½) can be adjusted by adding a hardening agent to the gelatin of the binder or by varying the condition of storing the coated photographic material. Additionally, the photographic material of the present invention is desired to have a swelling degree of from 150 to 400%. The swelling degree as referred to herein is calculated from the maximum swollen film thickness as obtained under the above-mentioned conditions, on the basis of a formula of:

(maximum swollen film thickness–original film thickness)/(original film thickness).

The color photographic material of the present invention can be developed by any ordinary method, for example, in accordance with the process described in the above-mentioned RD No. 17643, pages 28 and 29, and RD No. 18716, page 615, from left column to right column.

The silver halide color photographic material of the present invention can contain a color developing agent for the purpose of simplifying and accelerating the processing of the material. For incorporation of a color developing agent into the photographic material, various precursors of the agent are preferably used. For example, they include indoaniline compounds described in U.S. Pat. No. 3,342,597, Schiff base compounds described in U.S. Pat. No. 3,342,599 and RD Nos. 14850 and 15159, and the compounds described in RD No. 13924, as the precursors.

The present invention is explained in more detail by way of the following examples, which, however, are not intended to restrict the scope of the present invention.

EXAMPLE 1

(1) Formation of Supports:

The following Supports A to C were formed by the methods mentioned below.

Support A: Polyethylene naphthalate (PEN) of 40 µm, 80 µm or 122 µm thick

Support B: Polyethylene terephthalate (PET) of 90 µm thick

Support C: Triacetyl cellulose (TAC) of 122 µm thick

Support A:

One hundred parts by weight of a commercial product polyethylene-2,6-naphthalate polymer was melted with 2 parts of a commercial ultraviolet absorbent Tinuvin P. 326 (produced by Ciba-Geigy), after having been dried by an ordinary method, at 300° C. and then extruded through a T-die. The film was lengthwise stretched 3.3 times at 140° C. and then widthwise stretched 3.3 times at 130° C. This was then fixed at 250° C. for 6 seconds to obtain a film of 40 µm, 80 µm or 122 µm thick.

Support B:

A commercial product polyethylene terephthalate polymer was biaxially stretched and fixed by an ordinary method to obtain a film of 90 µm thick.

Support C:

Triacetyl cellulose was filmed by an ordinary solution spreading method (Band method) in which the weight ratio of methylene chloride/methanol was 82/18, the TAC concentration was 13% and the plasticizer (TPP/BDP=2/1; TPP is triphenyl phosphate, BDP is biphenyldiphenyl phosphate) concentration was 15% by weight.

(2) Coating of Subbing Layer:

Both surfaces of Supports A and B were treated by corona-discharging and then coated with a subbing layer having the composition mentioned below. For the corona-discharging, a solid state corona-discharging machine 6KVA Model (manufactured by Pillar) was used and the 30 cm-wide support was treated at a speed of 20 m/min. From the current and voltage values read, the strength of treating the support was 0.375 KV.A.min/m$^2$. The discharging frequency for the treatment was 9.6 KHz, and the gap clearance between the electrode and the dielectric roll was 1.6 mm.

| Composition of Subbing Layer: | |
| --- | --- |
| Gelatin | 3 g |
| Distilled Water | 250 cc |
| Sodium α-sulfo-di-2-ethylhexyl Succinate | 0.05 g |
| Formaldehyde | 0.02 g |

A subbing layer having the composition mentioned below was coated on Support C.

| | |
| --- | --- |
| Gelatin | 0.2 g |
| Salicylic Acid | 0.1 g |
| Methanol | 15 cc |
| Acetone | 85 cc |
| Formaldehyde | 0.01 g |

(3) Coating of Backing Layer:

After the subbing layer was coated on one surface of each of Supports A to C, a backing layer having the composition mentioned below was coated on the other surface.

(3-1) Preparation of Dispersion of Fine Conductive Grains (dispersion of tin oxide-antimony oxide composite):

Two hundred thirty parts by weight of stannic chloride hydrate and 23 parts by weight of antimony trichloride were dissolved in 3000 parts by weight of ethanol to obtain a uniform solution. One N aqueous sodium hydroxide solution was dropwise added to the uniform solution until the latter had pH of 3, whereby co-precipitates of colloidal stannic oxide and antimony oxide were formed. The co-precipitates thus formed were allowed to stand as they were at 50° C. for 24 hours to obtain reddish brown colloidal precipitates.

The reddish brown colloidal precipitates were separated by centrifugation. In order to remove the excess ions, water was added to the co-precipitates for washing them by centrifugation. The operation was repeated three times whereby the excess ions were removed from the co-precipitates.

Two hundred parts by weight of the colloidal precipitates from which the excess ions had been removed were again dispersed in 1500 parts by weight of water, and the resulting dispersion was sprayed into a firing furnace of 600° C. to obtain a bluish powder of fine grains of tin oxide-antimony oxide composite having a mean grain size of 0.2 µm. The specific resistivity of the fine powdery grains was 25 ω.cm.

A mixed liquid comprising 40 parts by weight of the fine powdery grains and 60 parts by weight of water was adjusted to have a pH of 7.0 and roughly dispersed with a stirrer. This was then further dispersed in a horizontal sand mill (Dyno Mill, trade name by Willya Bachofenag) until the residence time was 30 minutes.

(3-2) Formation of Backing Layer:

The following composition (A) was coated on the support and dried at 130° C. for 30 seconds to have a dry thickness of 0.3 µm. In addition, the following Coating Liquid (B) was coated over the layer and dried at 130° C. for 2 minutes to have a dry thickness of 0.1 μm.

| Composition (A): | |
|---|---|
| Dispersion of Conductive Fine Grains (prepared above) | 10 wt. pts. |
| Gelatin | 1 wt. pt. |
| Water | 27 wt. pts. |
| Methanol | 60 wt. pts. |
| Resorcinol | 2 wt. pts. |
| Polyoxyethylene Nonylphenyl Ether | 0.01 wt. pt. |
| Coating Liquid (B): | |
| Cellulose Triacetate | 1 wt. pt. |
| Acetone | 70 wt. pts. |
| Methanol | 15 wt. pts. |
| Dichloromethylene | 10 wt. pts. |
| P-chlorophenol | 4 wt. pts. |

(4) Heat Treatment of Supports:

After being coated with the subbing layer and backing layer in the manner mentioned above, the supports were heat-treated under the conditions shown in Tables 1-1 and 1-2. For the heat treatment, each support was wound around a core reel having a diameter of 30 cm with the subbing layer-coated surface being outside.

In the following table "O" indicates good results, "X" indicates poor results, and "Δ" indicates fair results.

TABLE 1-1

| No. | Support | Tg (°C.) | Thickness (μm) | Heat Treatment | Modulus of Bending Elasticity (circle-ring method) (g) | Diameter of Core-setting Spool (mm) | Pressure Marks |
|---|---|---|---|---|---|---|---|
| A-1 | PEN | 119 | 80 | No | 33 | 6 | O |
| A-2 | PEN | 119 | 80 | No | 33 | 8 | O |
| A-3 | PEN | 119 | 80 | No | 33 | 10 | O |
| A-4 | PEN | 119 | 80 | No | 33 | 12 | O |
| A-5 | PEN | 119 | 80 | No | 33 | 14 | O |
| A-6 | PEN | 119 | 80 | 110° C., 24 hr | 34 | 6 | O |
| A-7 | PEN | 119 | 80 | 110° C., 24 hr | 34 | 8 | O |
| A-8 | PEN | 119 | 80 | 110° C., 24 hr | 34 | 10 | O |
| A-9 | PEN | 119 | 80 | 110° C., 24 hr | 34 | 12 | O |
| A-10 | PEN | 119 | 80 | 110° C., 24 hr | 34 | 14 | O |
| A-11 | PEN | 119 | 80 | 45° C., 1000 hr | 34 | 8 | O |
| A-12 | PEN | 119 | 40 | No | 4 | 8 | O |
| A-13 | PEN | 119 | 40 | 110° C., 24 hr | 4 | 8 | O |
| A-14 | PEN | 119 | 122 | No | 116 | 8 | O |
| A-15 | PEN | 119 | 122 | 110° C., 24 hr | 116 | 8 | O |
| A-16 | PEN | 119 | 80 | 125° C., 24 hr | 33 | 8 | O |
| A-17 | PEN | 119 | 80 | 110° C., 1600 hr | 33 | 8 | O |
| A-18 | PEN | 119 | 80 | 110° C., 24 hr | 34 | 3 | O |
| A-19 | PEN | 119 | 80 | 110° C., 24 hr | 34 | 2.5 | x |
| B-1 | PET | 69 | 90 | No | 34 | 8 | O |
| B-2 | PET | 69 | 90 | 60° C., 24 hr | 35 | 8 | O |
| C-1 | TAC | 120 | 122 | No | 36 | 8 | O |

TABLE 1-2

| No. | Curl Value (after processed) | Reduction of Curl Value (%) | Troubles in Development Uneven Development | Bent or Broken | Remarks |
|---|---|---|---|---|---|
| A-1 | 161 | — | x | x | Comparative sample |
| A-2 | 125 | — | O | x | Comparative sample |
| A-3 | 105 | — | O | x | Comparative sample |
| A-4 | 85 | — | O | x | Comparative sample |
| A-5 | 70 | — | O | O | Comparative sample |
| A-6 | 55 | 66 | O | O | Sample of the Invention |
| A-7 | 50 | 60 | O | O | Sample of the Invention |
| A-8 | 48 | 54 | O | O | Sample of the Invention |
| A-9 | 44 | 48 | O | O | Comparative sample |
| A-10 | 36 | 48 | O | O | Comparative sample |
| A-11 | 110 | 12 | O | O | Comparative sample |
| A-12 | 130 | — | O | x | Comparative sample |
| A-13 | 55 | 42 | O | x | Comparative sample |
| A-14 | 125 | — | O | x | Comparative sample |
| A-15 | 50 | 40 | O | O | Sample of the Invention |
| A-16 | 105 | 16 | O | x | Comparative sample |
| A-17 | 48 | 62 | O | O | Comparative sample |
| A-18 | 500 | — | O | O | Sample of the Invention |
| A-19 | 680 | — | Δ | x | Comparative sample |
| B-1 | 210 | — | x | x | Comparative sample |

TABLE 1-2-continued

| No. | Curl Value (after processed) | Reduction of Curl Value (%) | Troubles in Development | | Remarks |
|---|---|---|---|---|---|
| | | | Uneven Development | Bent or Broken | |
| B-2 | 205 | 2 | x | x | Comparative sample |
| C-1 | 140 | — | x | x | Comparative sample |

As comparative samples, those not heat-treated were prepared.

To determine the mechanical strength of the support samples, the modulus of bending elasticity, which is the most important factor for reducing the thickness of a support, of each support sample was measured. The measurement of the modulus of bending elasticity was effected by means of a so-called circle-ring method. Precisely, a 35 mm-wide sample was slit in its lengthwise direction to form a circle ring having a circumference of 10 cm. This was set horizontally with a load applied thereto, and the load by which the circle ring sample was deformed by 12 mm was measured. The thus measured value was taken as the criterion of the modulus of bending elasticity of the tested sample. The measurement was effected in such a way that the subbing layer of the test sample was the inner circumference of the circle ring. The conditions for the measurement were 25° C. and 60% RH.

The results of the measurement are shown in Table 1-1 above. PEN of 80 μm thick and PET of 90 μm thick both showed a modulus of bending elasticity corresponding to that of TAC of 122 μm thick. The value of each sample did not vary even after the heat treatment of the invention. PEN samples A-14 and A-15 each having a thickness of 122 μm like TAC demonstrated to have a modulus of bending elasticity 3 times or more as large as that of TAC of 122 μthick.

(5) Coating of Photographic Layers:

A plurality of layers each having the composition mentioned below were coated on the supports as previously prepared, to prepare multi-layer color photographic material Samples A-1 to A-19, B-1, B-2 and C-1.

Compositions of Photographic Layers:

Essential components constituting the photographic layers are grouped as follows:

ExC: Cyan Coupler

UV: Ultraviolet Absorbent

ExM: Magenta Coupler

HBS: High Boiling Point Organic Solvent

ExY: Yellow Coupler

H: Gelatin Hardening Agent

ExS: Sensitizing Dye

The number for each component indicates the amount coated by way of a unit of $g/m^2$. The amount of silver halide coated is represented as the amount of silver coated therein. The amount of sensitizing dye coated is represented by way of a molar unit to mol of silver halide in the same layer.

| First Layer: Anti-halation Layer | |
|---|---|
| Black Colloidal Silver | 0.18 as Ag |
| Gelatin | 1.40 |
| ExM-1 | 0.18 |
| ExF-1 | $2.0 \times 10^{-3}$ |
| HBS-1 | 0.20 |

| Second Layer: Interlayer | |
|---|---|
| Emulsion G | 0.065 as Ag |
| 2,5-Di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |

| Third Layer: Low-sensitivity Red-sensitive Emulsion Layer | |
|---|---|
| Emulsion A | 0.25 as Ag |
| Emulsion B | 0.25 as Ag |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.010 |
| ExC-5 | 0.020 |
| ExC-7 | 0.0050 |
| ExC-8 | 0.010 |
| Cpd-2 | 0.025 |
| HBS-1 | 0.10 |
| Gelatin | 0.87 |

| Fourth Layer: Middle-sensitivity Red-sensitive Emulsion Layer | |
|---|---|
| Emulsion D | 0.70 as Ag |
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.025 |
| ExC-7 | 0.0010 |
| ExC-8 | 0.0070 |
| Cpd-2 | 0.023 |
| HBS-1 | 0.10 |
| Gelatin | 0.75 |

| Fifth Layer: High-sensitivity Red-sensitive Emulsion Layer | |
|---|---|
| Emulsion E | 1.40 as Ag |
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.12 |
| ExC-3 | 0.045 |
| ExC-6 | 0.020 |
| ExC-8 | 0.025 |
| Cpd-2 | 0.050 |
| HBS-1 | 0.22 |
| HBS-2 | 0.10 |
| Gelatin | 1.20 |

| Sixth Layer: Interlayer | |
|---|---|
| Cpd-1 | 0.10 |
| HBS-1 | 0.50 |
| Gelatin | 1.10 |

| Seventh Layer: Low-sensitivity Green-sensitive Emulsion Layer | |
|---|---|
| Emulsion C | 0.35 as Ag |
| ExS-4 | $3.0 \times 10^{-5}$ |
| ExS-5 | $2.1 \times 10^{-4}$ |

-continued

| | |
|---|---|
| ExS-6 | $8.0 \times 10^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

Eighth Layer: Middle-sensitivity Green-sensitive Emulsion Layer

| | |
|---|---|
| Emulsion D | 0.80 as Ag |
| ExS-4 | $3.2 \times 10^{-5}$ |
| ExS-5 | $2.2 \times 10^{-4}$ |
| ExS-6 | $8.4 \times 10^{-4}$ |
| ExM-2 | 0.13 |
| ExM-3 | 0.030 |
| ExY-1 | 0.018 |
| HBS-1 | 0.16 |
| HBS-3 | $8.0 \times 10^{-3}$ |
| Gelatin | 0.90 |

Ninth Layer: High-sensitivity Green-sensitive Emulsion Layer

| | |
|---|---|
| Emulsion E | 1.25 as Ag |
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.010 |
| ExM-1 | 0.030 |
| ExM-4 | 0.040 |
| ExM-5 | 0.019 |
| Cpd-3 | 0.040 |
| HBS-1 | 0.25 |
| HBS-2 | 0.10 |
| Gelatin | 1.44 |

Tenth Layer: Yellow Filter Layer

| | |
|---|---|
| Yellow Colloidal Silver | 0.030 as Ag |
| Cpd-1 | 0.16 |
| HBS-1 | 0.60 |
| Gelatin | 0.60 |

Eleventh Layer: Low-sensitivity Blue-sensitive Emulsion Layer

| | |
|---|---|
| Emulsion C | 0.18 as Ag |
| ExS-7 | $8.6 \times 10^{-4}$ |
| ExY-1 | 0.020 |
| ExY-2 | 0.22 |
| EXY-3 | 0.50 |
| ExY-4 | 0.020 |
| HBS-1 | 0.28 |
| Gelatin | 1.10 |

Twelfth Layer: Middle-sensitivity Blue-sensitive Emulsion Layer

| | |
|---|---|
| Emulsion D | 0.40 as Ag |
| ExS-7 | $7.4 \times 10^{-4}$ |
| ExC-3 | $7.0 \times 10^{-3}$ |
| ExY-2 | 0.050 |
| ExY-3 | 0.10 |
| HBS-1 | 0.050 |
| Gelatin | 0.78 |

Thirteenth Layer: High-sensitivity Blue-sensitive Emulsion Layer

| | |
|---|---|
| Emulsion F | 1.00 as Ag |
| ExS-7 | $4.0 \times 10^{-4}$ |
| ExY-2 | 0.10 |
| ExY-3 | 0.10 |
| HBS-1 | 0.070 |
| Gelatin | 0.86 |

Fourteenth Layer: First Protective Layer

| | |
|---|---|
| Emulsion G | 0.20 as Ag |
| UV-4 | 0.11 |
| UV-5 | 0.17 |
| HBS-1 | $5.0 \times 10^{-2}$ |
| Gelatin | 1.00 |

Fifteenth Layer: Second Protective Layer

| | |
|---|---|
| H-1 | 0.40 |
| B-1 (diameter 1.7 μm) | $5.0 \times 10^{-2}$ |
| B-2 (diameter 1.7 μm) | 0.10 |
| B-3 | 0.10 |
| S-1 | 0.20 |
| Gelatin | 1.20 |

In addition, the respective layers contained any of W-1 through W-3, B-4 through B-7, F-1 through F-17, and iron salt, lead salt, gold salt, platinum salt, iridium salt and rhodium salt, so as to have improved storability, processability, pressure resistance, fungicidal and bactericidal properties, antistatic property and coatability.

Structural formulae of the compounds used as well as the emulsions used are shown below.

TABLE 2

| | Mean AgI Content (%) | Mean Grain Size (μm) | Fluctuation Coefficient to Grain Size (%) | Ratio of Diameter/ Thickness | Ratio of Silver Contents [core/ interlayer/shell] (as AgI content %) | Structure and Shape of Grains |
|---|---|---|---|---|---|---|
| Emulsion A | 4.0 | 0.45 | 27 | 1 | [1/3] (13/1) | two-layer structural octahedral grains |
| Emulsion B | 8.9 | 0.70 | 14 | 1 | [3/7] (25/2) | two-layer structural octahedral grains |
| Emulsion C | 2.0 | 0.55 | 25 | 7 | — | uniform structural tabular grains |
| Emulsion D | 9.0 | 0.65 | 25 | 6 | [12/59/29] (0/11/8) | three-layer structural tabular grains |
| Emulsion E | 9.0 | 0.85 | 23 | 5 | [8/59/33] (0/11/8) | three-layer structural tabular grains |
| Emulsion F | 14.5 | 1.25 | 25 | 3 | [37/63] (34/3) | two-layer structural tabular grains |
| Emulsion G | 1.0 | 0.07 | 15 | 1 | — | uniform structural fine grains |

In Table 2 above;
(1) Emulsions A to F had been subjected to reduction sensitization with thiourea dioxide and thiophosphonic acid during formation of the grains, in accordance with the example of JP-A-2-191938;
(2) Emulsions A to F had been subjected to gold sensitization, sulfur sensitization and selenium sensitization in the presence of the color sensitizing dyes in the respective light-sensitive layers and sodium thiocyanate, in accordance with the example of JP-A-3-237450;
(3) for preparation of tabular grains, a low molecular gelatin was used in accordance with the example of JP-A-1-158426; and
(4) tabular grains and normal crystalline grains having a granular structure were observed to have dislocation lines as described in JP-A-3-237450, with a high-pressure electronic microscope.

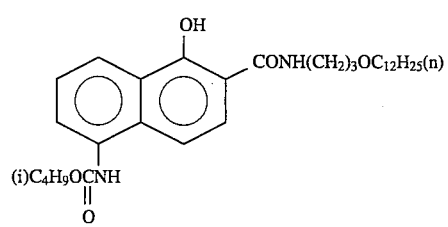

ExC-1

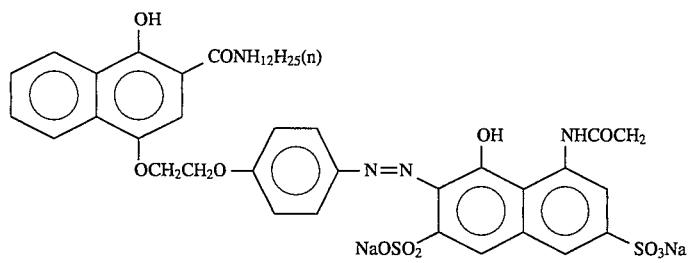

ExC-2

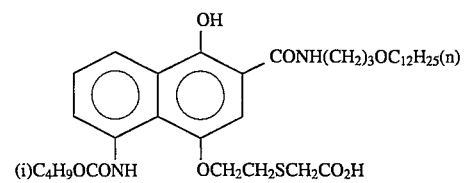

ExC-3

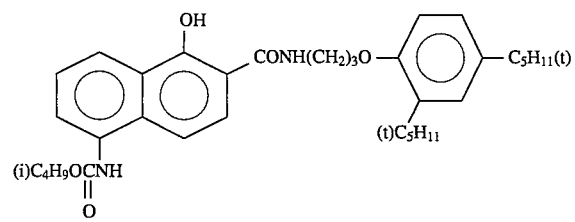

ExC-4

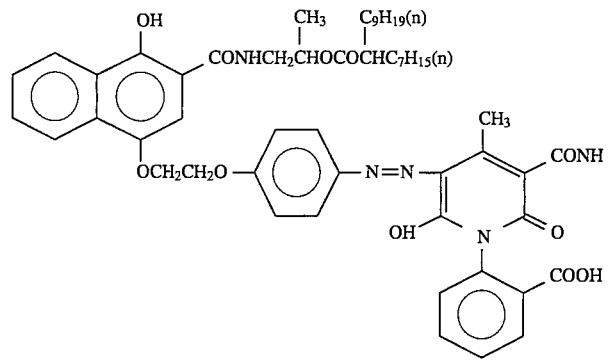

ExC-5

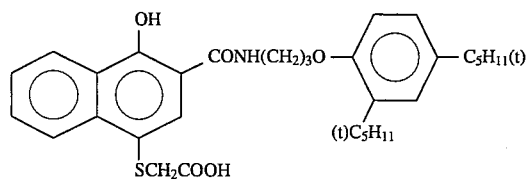

ExC-6

ExC-7
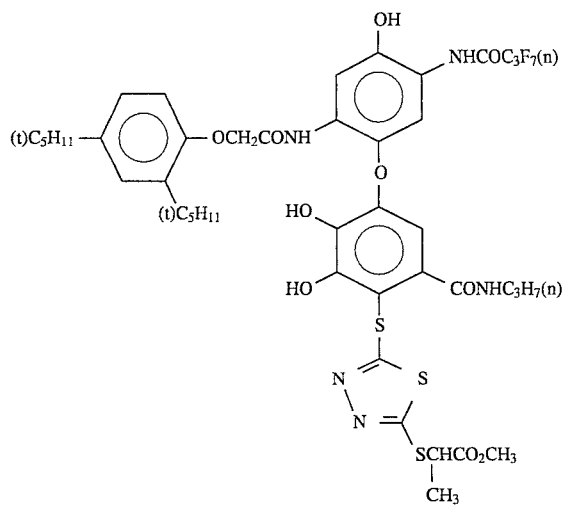
ExC-8
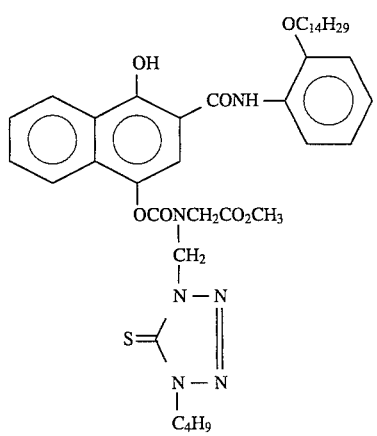
ExM-1
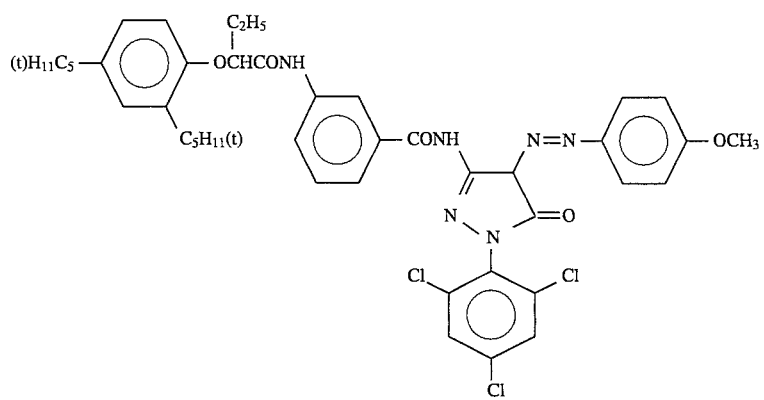
ExM-2
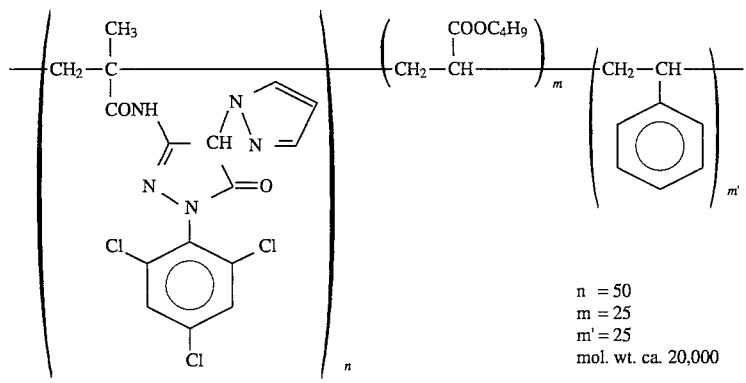
n = 50
m = 25
m' = 25
mol. wt. ca. 20,000

ExM-3
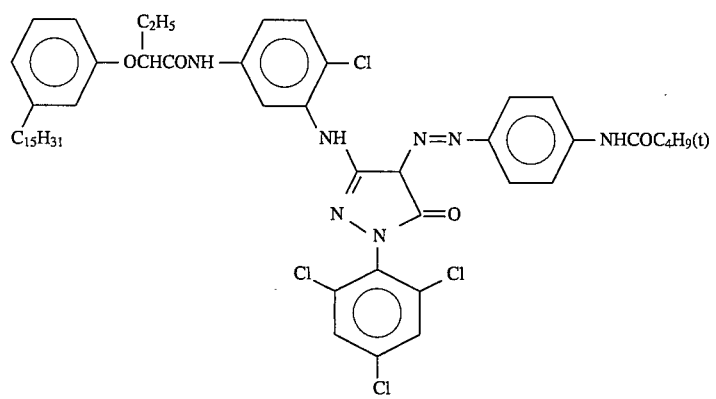
ExM-4
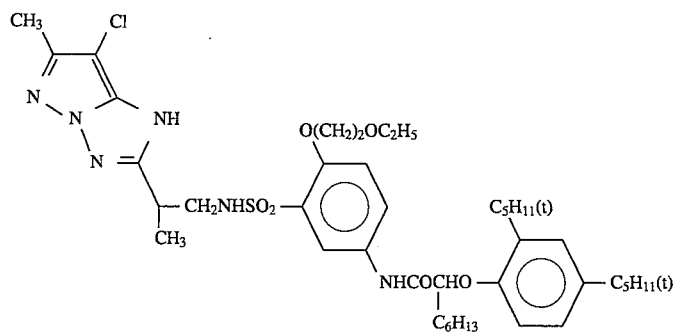
ExM-5
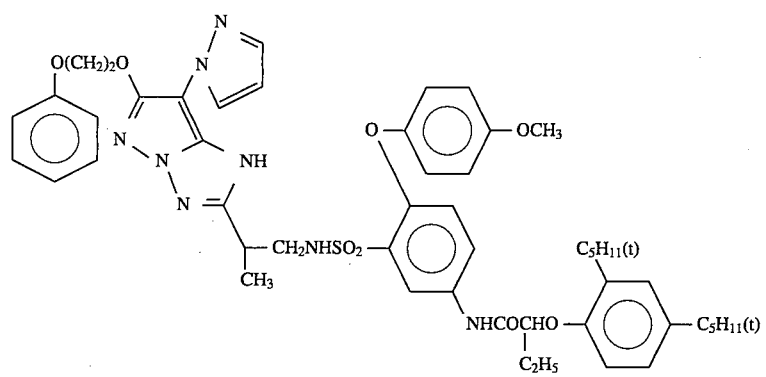
ExY-1
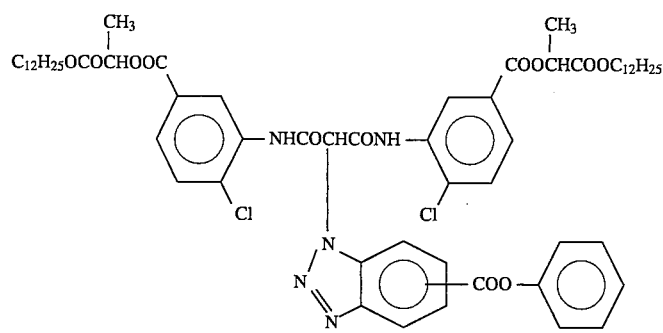

-continued
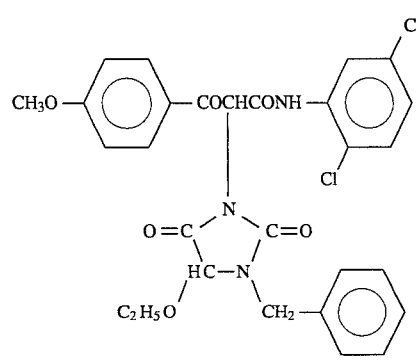
ExY-2
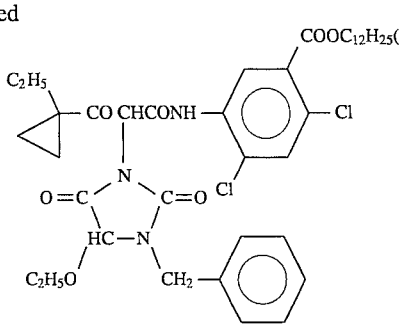
ExY-3
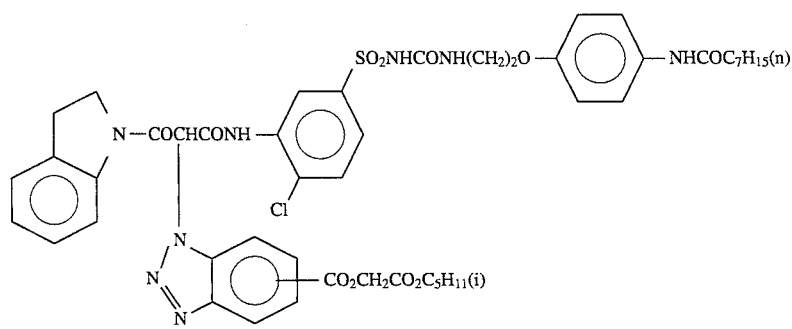
ExY-4
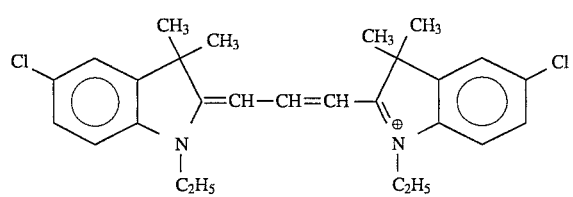
ExF-1
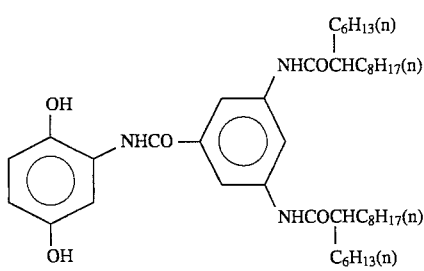
Cpd-1
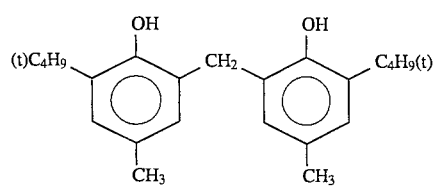
Cpd-2
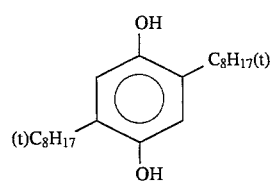
Cpd-3
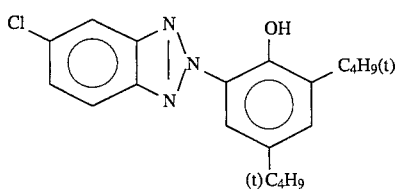
UV-1
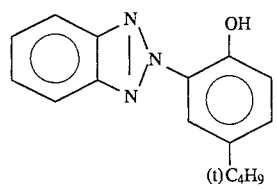
UV-2
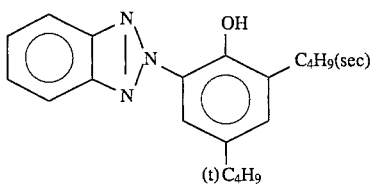
UV-3

-continued
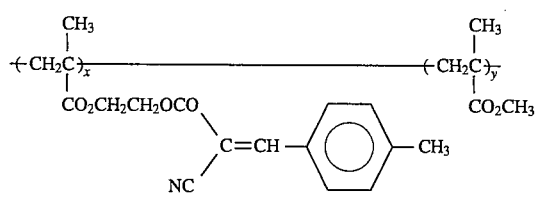
UV-4
x:y = 70:30 (wt%)
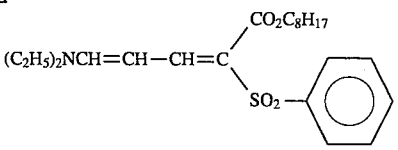
(UV-5)
Triscresyl Phosphate (HBS-1)
Di-N-butyl Phthalate (HBS-2)
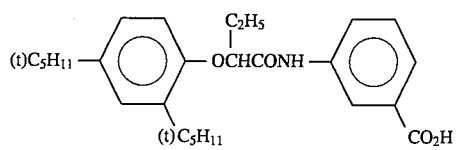
(HBS-3)
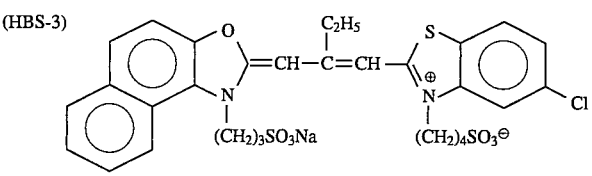
ExS-1
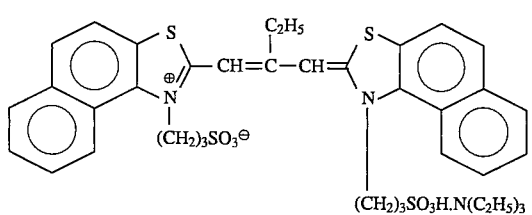
ExS-2
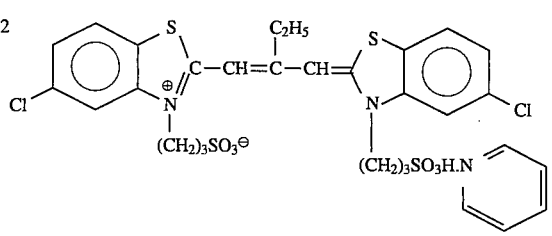
ExS-3
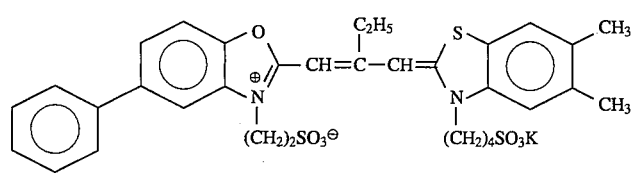
ExS-4
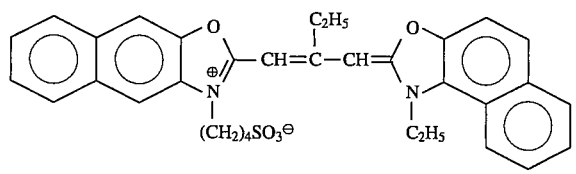
ExS-5
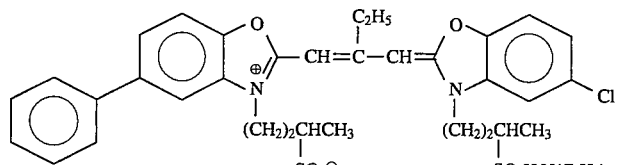
ExS-6
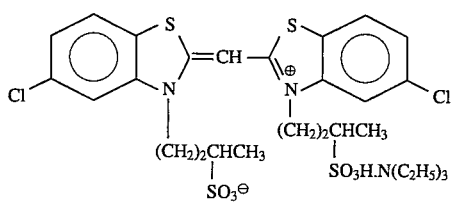
ExS-7
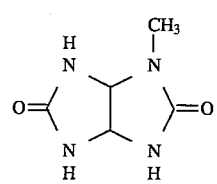
S-1
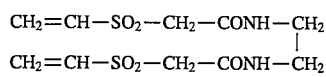
H-1
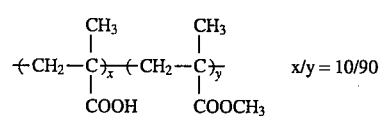
B-1
x/y = 10/90

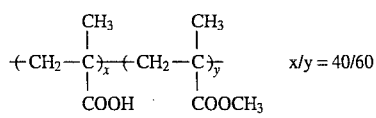 x/y = 40/60
-continued
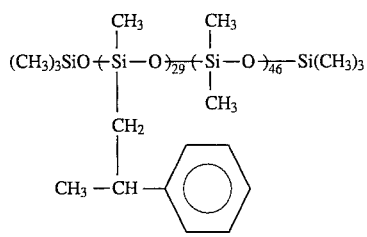 B-2
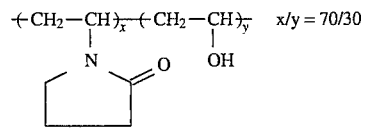 B-3
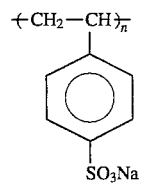
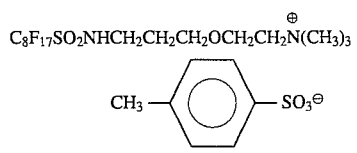 x/y = 70/30 (B-5)
B-4
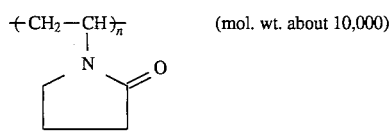 (mol. wt. about 10,000) (B-6)
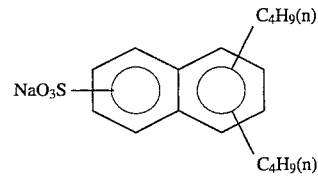 (W-1)
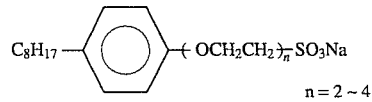 (W-2)
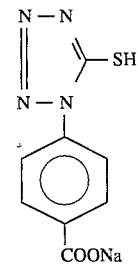
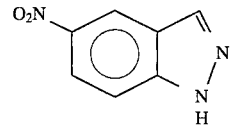 W-3
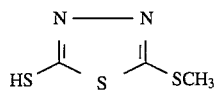 F-1
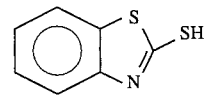 F-2
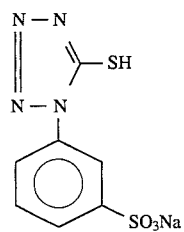 F-3
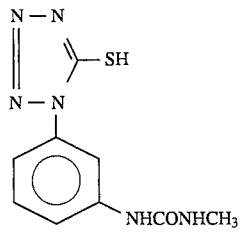 F-4
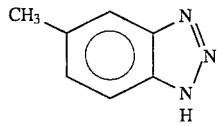 F-5
F-6
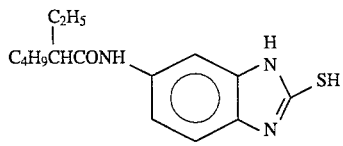 F-7
F-8

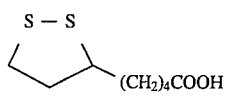 F-9

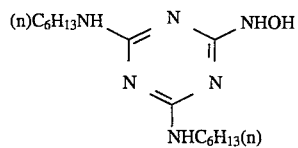 F-10

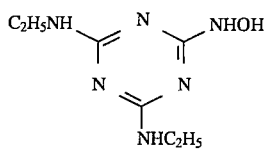 F-11

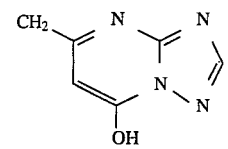 F-12

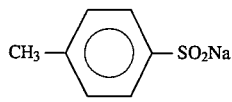 F-13

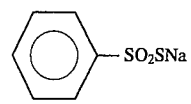 F-14

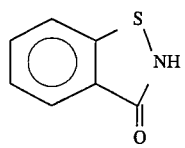 F-15

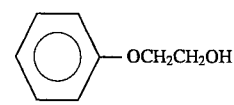 F-16

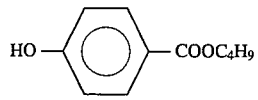 F-17

(6) Evaluation of Samples:

Photographic film Samples A-1 to A-19, B-1, B-2 and C-1 thus prepared were tested with respect to their curl in accordance with the process mentioned below.

(6-1) Core Setting:

Each sample film having a width of 35 mm was slit to have a length of 1.2 m. Each sample was conditioned overnight at 25° C. and 60% RH and wound around a spool having a diameter of from 6 to 14 mm, with the photographic layers being inside, as indicated in Table 1-1. The roll film sample was put in a sealed container and heated at 80° C. for 2 hours for curling it. The temperature condition corresponded to the condition in which film is put in a car in a summer season.

(6-2) Development, Measurement of Curl:

The film samples as curled under the above-mentioned condition were cooled overnight in a room at 25° C. and then taken out from the sealed containers. These were developed with an automatic developing machine (Minilabo FE-550B Model; manufactured by Fuji Photo Film Co., Ltd.) and then immediately the degree of the curl of each sample was measured at 25° C. under 60% RH with a curl-measuring plate.

Development of the samples was effected in accordance with the process described below.

| Color Development Process: | | |
|---|---|---|
| Step | Temperature | Time |
| Color Development | 38° C. | 3 min |
| Stopping | 38° C. | 1 min |
| Rinsing | 38° C. | 1 min |
| Bleaching | 38° C. | 2 min |
| Rinsing | 38° C. | 1 min |
| Fixation | 38° C. | 2 min |

-continued

| Color Development Process: | | |
|---|---|---|
| Step | Temperature | Time |
| Rinsing | 38° C. | 1 min |
| Stabilization | 38° C. | 1 min |

The compositions of the processing solutions used above are mentioned below.

| Color Developer: | |
|---|---|
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Disodium Ethylenediaminetetraacetate Dihydrate | 2 g |
| 4-Amino-3-methyl-N-ethyl-N-(β-hydroxyethyl)aniline Monosulfate | 4 g |
| Water to make | 1 liter |
| Stopping Solution: | |
| Sodium Thiosulfate | 10 g |
| Ammonium Thiosulfate (70% aqueous solution) | 30 ml |
| Acetic Acid | 30 ml |
| Sodium Acetate | 5 g |
| Potassium Alum | 15 g |
| Water to make | 1 liter |
| Bleaching Solution: | |
| Sodium Ethylenediaminetetraacetate/ Iron(III) Dihydrate | 100 g |
| Potassium Bromide | 50 g |
| Ammonium Nitrate | 50 g |
| Boric Acid | 5 g |
| Aqueous Ammonia to make | pH of 5.0 |
| Water to make | 1 liter |
| Fixer: | |

-continued

| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 liter |
| Stabilizer: | |
| Boric Acid | 5 g |
| Sodium Citrate | 5 g |
| Sodium Metaborate Tetrahydrate | 3 g |
| Potassium Alum | 15 g |
| Water to make | 1 liter |

(6-3) Results:

The test results obtained are shown in Table 1-2 above. Comparing the non-heat-treated Samples A-1 to A-5 and the heat-treated Samples A-6 to A-10, the values of the curl of the latter were obviously smaller than those of the former, from which the effect of the heat treatment is obvious. The effect was extremely great in the heat-treated Samples A-6 to A-8 which were wound around a core-setting spool having a diameter of 10 mm or less. Specifically, the uncurling degree of these Samples A-6 to A-8 was great, from 54% to 66%.

As a result of the effect, there was neither "uneven development" nor "bending or breaking" of the heat-treated samples during their development, even though the samples were wound around a thin spool having a diameter of from 3 to 10 mm. Use of such a thin spool for winding the heat-treated samples involves no problem. However, when a thinner spool having a diameter of less than 3 mm was used, the roll films involved the problems of "bending or breaking", "uneven development" and pressure marks.

On the other hand, if a thick spool having a diameter of more than 10 mm was used (see Samples A-9 and A-10), the uncurling degree was low, 48%. From these results, it is understood that the present invention is effective when a spool having a diameter of from 3 mm to 10 mm is used for winding the photographic film. However, the heat-treatment of the present invention is saturated in 1500 hours or more. For instance, the property of Sample A-17 heat-treated at 110° C. for 1600 hours was not much different from that of Sample A-7 heat-treated at the same temperature for 24 hours.

Where the heat treatment was effected at a temperature of 50° C. or lower, the uncurling degree of the heat-treated sample (see Sample A-11) was low. Where the heat treatment was effected at a temperature higher than Tg or at 125° C. (see Sample A-16), the uncurling degree of the heat-treated sample was extremely small.

Regarding the thickness of the support, Samples A-12 and A-13 each having a thin support were bent in the drying zone of the Minilabo developing machine due to the thermal shrinkage of the photographic layers, although the degree of the curl of both was small. From this result, it is understood that the thickness of the support must be 50 μm or more.

On the other hand, the heat treatment of PET having a Tg lower than 90° C. under the core-setting conditions of 80° C. and 2 hours was almost ineffective to obtain a degree of reduction of the curl of the film of only 2%. Because of the insufficient uncurling heat treatment, the heat-treated PET film samples involved difficulty in their development.

Sample C-1 having TAC as its support displayed an uncurling effect by the heat treatment to some degree, but it still had trouble in its development.

As is obvious from the results of Samples A-6 to A-8, the size of the patrone for a roll film may noticeably be reduced to a small size when a polyester film having Tg of 90° C. or higher and having been heat treated at a temperature from 50° C. to its Tg for a period of from 0.1 to 1500 hours is used as a support of a roll film which is wound around a spool having a diameter of 10 mm or less. Additionally, it is also noted that the roll film is free from troubles in its development caused by curl.

EXAMPLE 2

(1) Formation of Photographic Material Samples:

Polyester supports were prepared by drying pellets of PEN, PET, PAr and PCT at 150° C. for 4 hours in vacuum and kneading and extruding them through a double-screw extruder at 280° C. in the ratios indicated in Table 3-1 below, followed by pelletizing the polymer blend.

The thus pelletized polymer blend was filmed in the same manner as in Example 1. This was coated with a subbing layer and a backing layer and then heat-treated in the same manner as in Example 1. The modulus of bending elasticity of each sample film was measured by the same circle-ring method as in Example 1. The same photographic layers as those in Example 1 were coated on each support sample to obtain photographic material Samples D-1 to D-19.

(2) Evaluation of Photographic Material Samples:

The degree of curl of each of the thus prepared photographic film Samples D-1 to D-19 was measured in accordance with the same process as in Example 1. In addition, the samples were subjected to sensitometry to determine the degree of fluorescence from the support.

(3) Results:

The test results are shown in Table 3-2 below.

In the following table "O" indicates good results, "X" indicates poor results, and "Δ" indicates fair results.

TABLE 3-1

| Sample No. | Composition of Support (wt/wt %) PEN/PET/PAr/PCT | Tg (°C.) | Thickness (μm) | Heat Treatment | Modulus of Bending Elasticity (circle-ring method) (g) | Diameter of Coresetting Spool (mm) |
| --- | --- | --- | --- | --- | --- | --- |
| D-1 | 60/40/0/0 | 95 | 80 | No | 30 | 8 |
| D-2 | 60/40/0/0 | 95 | 80 | No | 30 | 10 |
| D-3 | 60/40/0/0 | 95 | 80 | No | 30 | 12 |
| D-4 | 60/40/0/0 | 95 | 80 | No | 30 | 14 |
| D-5 | 60/40/0/0 | 95 | 80 | 85° C. × 24 hr | 30 | 8 |
| D-6 | 60/40/0/0 | 95 | 80 | 85° C. × 24 hr | 30 | 10 |
| D-7 | 60/40/0/0 | 95 | 80 | 85° C. × 24 hr | 30 | 12 |
| D-8 | 60/40/0/0 | 95 | 80 | 85° C. × 24 hr | 30 | 14 |
| D-9 | 40/60/0/0 | 81 | 80 | No | 28 | 8 |
| D-10 | 40/60/0/0 | 81 | 80 | 71° C. × 24 hr | 28 | 8 |
| D-11 | 100/0/0/0 | 119 | 80 | 110° C. × 24 hr | 33 | 8 |

TABLE 3-1-continued

| Sample No. | Composition of Support (wt/wt %) PEN/PET/PAr/PCT | Tg (°C.) | Thickness (μm) | Heat Treatment | Modulus of Bending Elasticity (circle-ring method) (g) | Diameter of Coresetting Spool (mm) |
|---|---|---|---|---|---|---|
| D-12 | 0/0/50/50 | 118 | 80 | No | 27 | 8 |
| D-13 | 0/0/50/50 | 118 | 80 | No | 27 | 10 |
| D-14 | 0/0/50/50 | 118 | 80 | No | 27 | 12 |
| D-15 | 0/0/50/50 | 118 | 80 | No | 27 | 14 |
| D-16 | 0/0/50/50 | 118 | 80 | 108° C. × 24 hr | 27 | 8 |
| D-17 | 0/0/50/50 | 118 | 80 | 108° C. × 24 hr | 27 | 10 |
| D-18 | 0/0/50/50 | 118 | 80 | 108° C. × 24 hr | 27 | 12 |
| D-19 | 0/0/50/50 | 118 | 80 | 108° C. × 24 hr | 27 | 14 |

TABLE 3-2

| No. | Curl Value (after processed) | Reduction of Curl Value (%) | Troubles in Development Uneven Development | Troubles in Development Bent or Broken | Influence of Fluorescence of Photographic Sensitivity Curve | Remarks |
|---|---|---|---|---|---|---|
| D-1 | 130 | — | O | x | O | Comparative sample |
| D-2 | 110 | — | O | x | O | Comparative sample |
| D-3 | 85 | — | O | x | O | Comparative sample |
| D-4 | 70 | — | O | x | O | Comparative sample |
| D-5 | 52 | 60 | O | O | O | Sample of the Invention |
| D-6 | 47 | 57 | O | O | O | Sample of the Invention |
| D-7 | 43 | 49 | O | O | O | Comparative sample |
| D-8 | 35 | 50 | O | O | O | Comparative sample |
| D-9 | 210 | — | x | x | O | Comparative sample |
| D-10 | 205 | 2 | x | x | O | Comparative sample |
| D-11 | 50 | — | O | O | O-Δ | Sample of the Invention |
| D-12 | 125 | — | O | x | O | Comparative sample |
| D-13 | 105 | — | O | x | O | Comparative sample |
| D-14 | 90 | — | O | x | O | Comparative sample |
| D-15 | 80 | — | O | x | O | Comparative sample |
| D-16 | 48 | 62 | O | x | O | Sample of the Invention |
| D-17 | 45 | 57 | O | O | O | Sample of the Invention |
| D-18 | 46 | 49 | O | O | O | Comparative sample |
| D-19 | 42 | 48 | O | O | O | Comparative sample |

Support Samples D-1 to D-10 were prepared by blending PEN and PET. Samples D-1 to D-8 all had Tg of higher than 90° C. When photographic film samples having one of the support samples having such a high Tg were wound individually around a spool having a diameter of 10 mm or less (see film Samples D-5 and D-6), the uncurling degree was large so that the film samples were free from troubles in the Minilabo processing machine. As opposed to them, however, D-9 and D-10 had Tg of lower than 90° C. so that they curled quite strongly. Even though they were combined with a spool having a diameter of 10 mm or less, the degree of reduction of the curl of them was only slight. Therefore, it is noted that the effect of the present invention may also be attained by winding the polymer blend system having a Tg of 90° C. or higher around a spool having a diameter of 10 mm or less.

On the other hand, the pure PEN Sample D-11 displayed a sufficient uncurling effect, as was already verified also in the previous Example 1. However, it emitted some fluorescent rays, which had a slight influence on the photographic sensitivity curve. As opposed to this, when some PET was added to the pure PEN (see Samples D-5 to D-8), the fluorescent influence of the support could be evaded though the modulus of bending elasticity of the polymer blend samples was somewhat lowered.

The PAr-PCT blend system also displayed the effect of the present invention. Precisely, as is noted from the test results of Samples D-12 to D-19 each having a Tg of 118° C., when the samples were annealed at a temperature lower than their Tg and wound around a spool having a diameter of 10 mm or less, the heat-treated samples showed a great reduction in curl value.

As is obvious from the above test results, a significant uncurling effect is obtained when a polyester film support having Tg of not lower than 90° C. is applied to a coresetting spool having a diameter of 10 mm or less, irrespective of the polyester composition.

EXAMPLE 3

(1) Formation of Photographic Material Samples:

Using a stainless autoclave, polyesters having a glass transition temperature of higher than 90° C. were prepared by interesterifying polycondensation a blending of a dicarboxylic acid component comprising dimethanol terephthalate (TPM) and dimethanol 2,6-naphthalenedicarboxylate and a diol component comprising ethylene glycol (EG), bisphenol A (BPA) and cyclohexane-dimethanol (CHDM) in the ratios indicated in Table 4-1 below in the presence of a catalyst of antimony trioxide of 0.025 mol (to the acid component).

The thus produced polyesters were filmed in the same manner as in Example 1. These were coated with a subbing layer and a backing layer and heat-treated, also in the same manner as in Example 1. The modulus of bending elasticity of each of the thus prepared samples was measured by the same circle-ring method as in Example 1. The support samples each were coated with the same photographic layers as those in Example 1 to obtain photographic film Samples E-1 to E-18.

(2) Evaluation of Photographic Material Samples:

The degree of the curl of each of the thus prepared photographic film Samples E-1 to E-18 was measured by the same process as in Example 1.

(3) Results:

The test results obtained are shown in Tables 4-1 and 4-2 below.

In the following table "O" indicates good results, "X" indicates poor results, and "Δ" indicates fair results.

TABLE 4-1

| Sample No. | Composition of Support (mol %) NDCA/TPM/EG/CHDM/BPA | Tg (° C.) | Thickness (μm) | Heat Treatment | Modulus of Bending Elasticity (circlering method) (g) |
|---|---|---|---|---|---|
| E-1 | 50/50/100/0/0 | 92 | 80 | No | 29 |
| E-2 | 50/50/100/0/0 | 92 | 80 | No | 29 |
| E-3 | 50/50/100/0/0 | 92 | 80 | No | 29 |
| E-4 | 50/50/100/0/0 | 92 | 80 | No | 29 |
| E-5 | 50/50/100/0/0 | 92 | 80 | 82° C. × 24 hr | 29 |
| E-6 | 50/50/100/0/0 | 92 | 80 | 82° C. × 24 hr | 29 |
| E-7 | 50/50/100/0/0 | 92 | 80 | 82° C. × 24 hr | 29 |
| E-8 | 50/50/100/0/0 | 92 | 80 | 82° C. × 24 hr | 29 |
| E-9 | 25/75/100/0/0 | 77 | 80 | 67° C. × 24 hr | 26 |
| E-10 | 25/75/100/0/0 | 77 | 80 | 67° C. × 24 hr | 26 |
| E-11 | 0/100/25/25/50 | 115 | 80 | No | 30 |
| E-12 | 0/100/25/25/50 | 115 | 80 | No | 30 |
| E-13 | 0/100/25/25/50 | 115 | 80 | No | 30 |
| E-14 | 0/100/25/25/50 | 115 | 80 | No | 30 |
| E-15 | 0/100/25/25/50 | 115 | 80 | 105° C. × 24 hr | 30 |
| E-16 | 0/100/25/25/50 | 115 | 80 | 105° C. × 24 hr | 30 |
| E-17 | 0/100/25/25/50 | 115 | 80 | 105° C. × 24 hr | 30 |
| E-18 | 0/100/25/25/50 | 115 | 80 | 105° C. × 24 hr | 30 |

TABLE 4-2

| No. | Diameter of Core-setting Spool (mm) | Curl Value (after processed) | Reduction of Curl Value (%) | Troubles in Development Uneven Development | Troubles in Development Bent or Broken | Influence of Fluorescence of Support on Photographic Sensitivity Curve | Remarks |
|---|---|---|---|---|---|---|---|
| E-1 | 8 | 135 | — | O | x | O | Comparative sample |
| E-2 | 10 | 115 | — | O | x | O | Comparative sample |
| E-3 | 12 | 90 | — | O | x | O | Comparative sample |
| E-4 | 14 | 75 | — | O | x | O | Comparative sample |
| E-5 | 8 | 51 | 62 | O | O | O | Sample of the Invention |
| E-6 | 10 | 48 | 58 | O | O | O | Sample of the Invention |
| E-7 | 12 | 45 | 50 | O | O | O | Comparative sample |
| E-8 | 14 | 38 | 49 | O | O | O | Comparative sample |
| E-9 | 8 | 220 | — | x | x | O | Comparative sample |
| E-10 | 8 | 215 | 2 | x | x | O | Comparative sample |
| E-11 | 8 | 125 | — | O | x | O | Comparative sample |
| E-12 | 10 | 105 | — | O | x | O | Comparative sample |
| E-13 | 12 | 85 | — | O | x | O | Comparative sample |
| E-14 | 14 | 70 | — | O | x | O | Comparative sample |
| E-15 | 8 | 49 | 61 | O | O | O | Sample of the Invention |
| E-16 | 10 | 45 | 57 | O | O | O | Sample of the Invention |
| E-17 | 12 | 36 | 49 | O | O | O | Comparative sample |
| E-18 | 14 | 35 | 50 | O | O | O | Comparative sample |

Samples E-1 to E-10 demonstrated examples of each having an NDCA/TPM/EG copolymer support. Samples E-1 to E-8 had Tg of 92° C. and were heat-treated. Of them, Samples E-5 and E-6 of the present invention were wound around a spool having a diameter of 10 mm or less. These samples of the present invention displayed a large degree of reduction of the curl. As these samples contained NDCA and TPM in a ratio of 1/1 to lower the naphthalene ring concentration in the support film, the influence of the fluorescence of the support film on the photographic sensitivity curve was little. Since the polymer film containing a NDCA/TPM ratio of 25/75 had a Tg of 77° C., which is lower than 90° C., the curl of the film was too strong to obtain the effect of the present invention.

Samples E-11 to E-18 demonstrated examples of each having a TPM/EG/CHDM/BPA copolymer support. These also gave the same results as the above-mentioned samples. That is, when samples having a support with Tg>90° C. were wound around a spool having a diameter of 10 mm or less, the degree of reduction of the curl of the heat-treated samples was great.

As is obvious from the above-mentioned results, the effect of the present invention may be attained when a polyester film support having a Tg of 90° C. or higher is employed.

Specifically, from the results of Examples 1 to 3, it is understood that when a polyester film support having a glass transition temperature of 90° C. or higher and having been heat-treated at a temperature between 50° C. and its glass transition temperature for a period of from 0.1 to 1500 hours is wound around a spool having a diameter of falling within the range of from 3 mm to 10 mm, the uncurling degree of the rolled support is large. Because of this effect, a photographic material of a roll film having the polyester film support is free from troubles, such as uneven development or bending or breaking of the film, in a so-called mini-laboratory developing device, when it is processed in the device. According to the present invention, therefore, there is provided a silver halide photographic material of a roll film which may be handled well with few troubles during its processing in a developing machine.

EXAMPLE 4

(1) Formation of Photographic Material Samples:

PET chips and PEN chips were separately melt-extruded and stretched 3.4 times in the lengthwise direction and then 4 times in the widthwise direction to obtain a biaxially stretched polyester film of 80 μm thick, whereupon an auxiliary heating source of an infrared heater was applied to one surface of the lengthwise stretching zone (in this example, the surface to be heated by the infrared heater was one which faced to the casting drum, and the surface is hereinafter referred to as a CD surface), as shown in the figure.

PEN was filmed by extrusion at 300° C. followed by stretching at a lengthwise stretching temperature (on the CD surface) of 140° C. and successively at a widthwise stretching temperature of 130° C., further followed by heat fixation at 250° C. for 6 seconds.

PET was filmed by extrusion at 270° C. followed by stretching at a lengthwise stretching temperature (on the CD surface) of 100° C. and successively at a widthwise stretching temperature of 110° C., further followed by heat fixation at 220° C. for 6 seconds.

During the stretching operation, the voltage applied to the infrared heater was varied to attain the temperature difference between the two surfaces of the film as indicated in Table 5-1 below. Thus, support Samples F-1 to F-7 and G-1 to G-4 were prepared.

In the following table "O" indicates good results, "X" indicates poor results, and "Δ" indicates fair results.

TABLE 5-1

| Sample No. | Support | Thickness (μm) | Glass Transition Temperature (°C.) | Lengthwise Stretching Temperature (on CD surface) (°C.) | Temperature Difference in Lengthwise Stretching (°C.) | Heat Treatment | Modulus of Bending Elasticity (circlering method) (g) |
| --- | --- | --- | --- | --- | --- | --- | --- |
| F-1 | PEN | 80 | 119 | 140 | 0 | No | 33 |
| F-2 | PEN | 80 | 119 | 140 | 20 | No | 33 |
| F-3 | PEN | 80 | 119 | 140 | 20 | 110° C., 6 hr | 33 |
| F-4 | PEN | 80 | 119 | 140 | 20 | 125° C., 6 hr | 33 |
| F-5 | PEN | 80 | 119 | 140 | 20 | 110° C., 1600 hr | 33 |
| F-6 | PEN | 80 | 119 | 140 | 20 | 110° C., 0.05 hr | 33 |
| F-7 | PEN | 80 | 119 | 140 | 20 | 45° C., 1400 hr | 33 |
| G-1 | PET | 80 | 69 | 100 | 0 | No | 24 |
| G-2 | PET | 80 | 69 | 100 | 20 | No | 24 |
| G-3 | PET | 80 | 69 | 100 | 20 | 60° C., 24 hr | 24 |
| G-4 | PET | 80 | 69 | 100 | 0 | 60° C., 24 hr | 24 |

TABLE 5-2

| No. | Curl Value (after development) | Reduction of Curl Value (%) | Troubles in Development Uneven Development | Bent or Broken | Remarks |
| --- | --- | --- | --- | --- | --- |
| F-1 | 125 | — | O | x | Comparative sample |
| F-2 | 70 | 44 | O | x | Comparative sample |
| F-3 | 44 | 65 | O | O | Sample of the Invention |
| F-4 | 115 | 8 | O | x | Comparative sample |
| F-5 | 42 | 66 | O | O | Comparative sample |
| F-6 | 120 | 4 | O | x | Comparative sample |
| F-7 | 83 | 34 | O | x | Comparative sample |
| G-1 | 210 | — | x | x | Comparative sample |
| G-2 | 200 | 5 | x | x | Comparative sample |
| G-3 | 195 | 7 | x | x | Comparative sample |
| G-4 | 195 | 7 | x | x | Comparative sample |

The films prepared in the manner mentioned above had a property of easily curling with the lower temperature surface being inside of the curl.

The films each were coated with a subbing layer and a backing layer and then heat-treated in the same manner as in Example 1. The modulus of bending elasticity of each of the thus coated and heat-treated samples was measured by the same circle-ring method as in Example 1.

The measured values are shown in Table 5-1 above. A PEN film of 80 μm thick had almost the same modulus of bending elasticity as a TAC film of 122 μm, without varying before and after their heat treatment.

The same photographic layers as those in Example 1 were coated on each of the film support to obtain photographic material Samples F-1 to F-7 and G-1 to G-4.

(2) Evaluation of Samples:

The degree of curl of each of the thus prepared Samples F-1 to F-7 and G-1 to G-4 was measured by the same process as in Example 1, except that samples were individually wound around a 8 mm-diameter spool. In addition, the samples were subjected to sensitometry to determine the degree of the fluorescence from the support.

(3) Test Results:

The test results are shown in Tables 5-1 and 5-2. PEN having a glass transition temperature higher than 90° C. and having been heat-treated for about 6 hours under the condition of having the indicated temperature difference between the two surfaces of the film, showed a degree of reduction of curl value comparable to that of a PEN film heat-treated for 24 hours under the condition of having no temperature difference. That is, the PEN sample needed ¼ of the heat-treating time for attaining the same result, when the heat-treatment was effected under the condition of having the indicated temperature difference.

The modulus of bending elasticity of PEN of 80 μm thick as measured by the circle-ring method was 33 g, which is close to 36 g of the modulus of bending elasticity of TAC of 122 μm thick. Therefore, employment of the PEN film heat-treated in accordance with the method of the present invention as a support of a photographic roll film is advantageous, as the film may be well wound around a thin spool having a diameter of 8 mm almost without being harmfully curled and additionally the thickness of the support film may be reduced to 80 μm.

As opposed to them, however, the heat treatment of a polyester film at a temperature higher than its Tg of 125° C. (see Sample F-4) is almost ineffective. On the contrary, if the temperature of the heat treatment is lower than 50° C., any significant uncurling effect could not be obtained (see Sample F-7) even though the heat-treatment was effected for a long period of time of 1400 hours.

Regarding the time for the heat treatment, no significant difference was admitted between Sample F-5 heat-treated at 110° C. for 1650 hours and Sample F-3 heat-treated at the same temperature for 6 hours; but the heat-treatment at 110° C. for a period of less than 0.1 hour was found almost ineffective (see Sample F-6).

Where PET having a glass transition temperature of lower than 90° C. was employed, the degree of curl of the film did not lower even after it was heat-treated and/or stretched under the condition of having temperature difference between the two surfaces of the film.

From these results, it is understood that the temperature difference between the two surfaces of a support film during stretching must be from 10° C. to 100° C., that the support film must have a glass transition temperature from 90° C. to 200° C., that the temperature of heat treatment of the support film must be from 50° C. to its Tg, and that the heating time must be from 0.1 hour to 1500 hours, in order to attain the uncurling effect of the present invention.

EXAMPLE 5

(1) Formation of Photographic Material Samples:

Polyester supports were prepared by drying pellets of PEN, PET, PAr and PCT at 150° C. for 4 hours in a vacuum and kneading and extruding them through a double-screw extruder at 280° C. in the ratios indicated in Table 6-1 below, followed by pelletizing the polymer blend.

The thus pelletized polymer blend was filmed in the same manner and under the same stretching conditions as in the case of filming PEN of Example 4. The temperature difference between the two surfaces of the film being stretched are shown in Table 6-1 below. This was coated with a subbing layer and a backing layer and then heat-treated in the same manner as in Example 1. The modulus of bending elasticity of each sample film was measured by the same circle-ring method as in Example 1. The same photographic layers as those in Example 1 were coated on each support sample to obtain photographic material Samples H-1 to H-13.

(2) Evaluation of Photographic Material Samples:

The degree of curl of each of the thus prepared photographic film Samples H-1 to H-13 was measured in accordance with the same process as in Example 1. In addition, the samples were subjected to sensitometry to determine the degree of fluorescence from the support.

(3) Results:

The test results are shown in Tables 6-1 and 6-2 below.

In the following table "O" indicates good results, "X" indicates poor results, and "Δ" indicates fair results.

TABLE 6-1

| Sample No. | Composition of Support (wt/wt %) PEN/PET/PAr/PCT | Tg (°C.) | Thicknes (μm) | Lengthwise Stretching Temperature (on CD surface) (°C.) | Temperature Difference in Lengthwise Stretching (°C.) | Heat Treatment | Modulus of Bending Elasticity (circlering method) (g) |
|---|---|---|---|---|---|---|---|
| H-1 | 80/20/0/0 | 104 | 80 | 140 | 0 | No | 32 |
| H-2 | 80/20/0/0 | 104 | 80 | 140 | 20 | No | 32 |
| H-3 | 80/20/0/0 | 104 | 80 | 140 | 20 | 94° C., 6 hr | 32 |
| H-4 | 60/40/0/0 | 95 | 80 | 140 | 0 | No | 30 |
| H-5 | 60/40/0/0 | 95 | 80 | 140 | 20 | No | 30 |
| H-6 | 60/40/0/0 | 95 | 80 | 140 | 20 | 85° C., 6 hr | 30 |
| H-7 | 40/60/0/0 | 81 | 80 | 140 | 0 | No | 28 |
| H-8 | 40/60/0/0 | 81 | 80 | 140 | 20 | No | 28 |
| H-9 | 40/60/0/0 | 81 | 80 | 140 | 20 | 71° C., 6 hr | 28 |
| H-10 | 40/60/0/0 | 81 | 80 | 140 | 0 | 71° C., 24 hr | 28 |

TABLE 6-1-continued

| Sample No. | Composition of Support (wt/wt %) PEN/PET/PAr/PCT | Tg (°C.) | Thickness (μm) | Lengthwise Stretching Temperature (on CD surface) (°C.) | Temperature Difference in Lengthwise Stretching (°C.) | Heat Treatment | Modulus of Bending Elasticity (circlering method) (g) |
|---|---|---|---|---|---|---|---|
| H-11 | 0/0/50/50 | 118 | 80 | 140 | 0 | No | 27 |
| H-12 | 0/0/50/50 | 118 | 80 | 140 | 20 | No | 27 |
| H-13 | 0/0/50/50 | 118 | 80 | 140 | 20 | 108° C., 6 hr | 27 |

TABLE 6-2

| No. | Curl Value (after processed) | Reduction of Curl Value (%) | Troubles in Development - Uneven Development | Troubles in Development - Bent or Broken | Influence of Fluorescence of Photographic Sensitivity Curve | Remarks |
|---|---|---|---|---|---|---|
| H-1 | 95 | — | O | x | O–Δ | Comparative sample |
| H-2 | 59 | 38 | O | x | O–Δ | Comparative sample |
| H-3 | 33 | 65 | O | O | O–Δ | Sample of the Invention |
| H-4 | 130 | — | O | x | O | Comparative sample |
| H-5 | 75 | 42 | O | x | O | Comparative sample |
| H-6 | 50 | 62 | O | O | O | Sample of the Invention |
| H-7 | 210 | — | x | x | O | Comparative sample |
| H-8 | 205 | 2 | x | x | O | Comparative sample |
| H-9 | 200 | 5 | x | x | O | Comparative sample |
| H-10 | 200 | 5 | x | x | O | Comparative sample |
| H-11 | 125 | — | O | x | O | Comparative sample |
| H-12 | 70 | 44 | O | x | O | Comparative sample |
| H-13 | 44 | 65 | O | O | O | Sample of the Invention |

Samples H-1 to H-10 demonstrated examples of a PEN/PET copolymer system. Samples H-1 to H-6 each having Tg of higher than 90° C. displayed the effect of the present invention. Specifically, they attained significant reduction of curl of the film by heat-treatment of only ¼ of the general heat-treatment and, as a result, the roll films of them were free from the troubles in development. PEN itself emits some fluorescent rays, which often have, when used as a support of a photographic material, a slight but negligible influence on photographic sensitivity. When the ratio of PEN in the polymer blend is lowered, the fluorescence of the polymer film caused by the naphthalene ring of PEN decreases. As a result, Sample H-3 and the following samples were quite free from the problem of the fluorescence of the support. However, the polymer blend has a drawback that the modulus of bending elasticity of the film lowers in proportion to the decrease of the ratio of PEN therein.

As opposed to them, Samples H-7 to H-10 each having Tg of lower than 90° C. did not display the effect of the present invention, even though they were heat-treated and stretched by the method of the invention.

Also, a PAr/PCT polymer blend system displayed the effect of the present invention, as they have Tg of higher than 90° C.

As is obvious from the above test results, a significant uncurling effect is obtained when the method of the present invention is applied to a polyester film support having Tg of not lower than 90° C., irrespective of the polyester composition.

EXAMPLE 6

(1) Formation of Photographic Material Samples:

Using a stainless autoclave, polyesters having a glass transition temperature higher than 90° C. were prepared by interesterifying polycondensation a blending of a dicarboxylic acid component comprising dimethanol terephthalate (TPM) and dimethanol 2,6-naphthalenedicarboxylate and a diol component comprising ethylene glycol (EG), bisphenol A (BPA) and cyclohexane-dimethanol (CHDM) in the ratios indicated in Table 7-1 below in the presence of a catalyst of antimony trioxide of 0.025 mol (to the acid component).

The thus produced polyesters each were filmed in the same manner and under the same stretching condition as in the case of filming PEN of Example 4. The temperature differences between the two surfaces of the film being stretched are shown in Table 7-1 below. These were coated with a subbing layer and a backing layer and heat-treated in the same manner as in Example 1. The modulus of bending elasticity of each of the thus prepared samples was measured by the same circle-ring method as in Example 1. The support samples each were coated with the same photographic layers as those in Example 1 to obtain photographic film Samples I-1 to I-13.

(2) Evaluation of Photographic Material Samples:

The degree of the curl of each of the thus prepared photographic film Samples I-1 to I-13 was measured by the same process as in Example 1.

(3) Results:

The test results obtained are shown in Tables 7-1 and 7-2 below.

In the following table "O" indicates good results, "X" indicates poor results, and "Δ" indicates fair results.

TABLE 7-1

| Sample No. | Composition of Support (wt/wt %) NDCA/TPM/EG/CHDM/BPA | Tg (°C.) | Thickness (μm) | Lengthwise Stretching Temperature (on CD surface) (°C.) | Temperature Difference in Lengthwise Stretching (°C.) | Heat Treatment |
| --- | --- | --- | --- | --- | --- | --- |
| I-1 | 75/25/100/0/0 | 102 | 80 | 140 | 0 | No |
| I-2 | 75/25/100/0/0 | 102 | 80 | 140 | 25 | No |
| I-3 | 75/25/100/0/0 | 102 | 80 | 140 | 25 | 92° C., 6 hr |
| I-4 | 50/50/100/0/0 | 92 | 80 | 140 | 0 | No |
| I-5 | 50/50/100/0/0 | 92 | 80 | 140 | 25 | No |
| I-6 | 0/50/100/0/0 | 92 | 80 | 140 | 25 | 82° C., 6 hr |
| I-7 | 25/75/100/0/0 | 77 | 80 | 140 | 0 | No |
| I-8 | 25/75/100/0/0 | 77 | 80 | 140 | 25 | No |
| I-9 | 25/75/100/0/0 | 77 | 80 | 140 | 25 | 67° C., 6 hr |
| I-10 | 25/75/100/0/0 | 77 | 80 | 140 | 0 | 67° C., 24 hr |
| I-11 | 0/100/25/25/50 | 112 | 80 | 140 | 0 | No |
| I-12 | 0/100/25/25/50 | 112 | 80 | 140 | 25 | No |
| I-13 | 0/100/25/25/50 | 112 | 80 | 140 | 25 | 102° C., 6 hr |

TABLE 7-2

| No. | Modulus of Bending Elasticity (circlering method) (g) | Curl Value (after processed) | Reduction of Curl Value (%) | Troubles in Development | | Remarks |
| --- | --- | --- | --- | --- | --- | --- |
| | | | | Uneven Development | Bent or Broken | |
| I-1 | 30 | 130 | — | ○ | x | Comparative sample |
| I-2 | 30 | 75 | 42 | ○ | x | Comparative sample |
| I-3 | 30 | 50 | 62 | ○ | ○ | Sample of the Invention |
| I-4 | 29 | 135 | — | ○ | x | Comparative sample |
| I-5 | 29 | 70 | 48 | ○ | x | Comparative sample |
| I-6 | 29 | 48 | 64 | ○ | ○ | Sample of the Invention |
| I-7 | 26 | 220 | — | x | x | Comparative sample |
| I-8 | 26 | 215 | 2 | x | x | Comparative sample |
| I-9 | 26 | 210 | 4 | x | x | Comparative sample |
| I-10 | 26 | 215 | 2 | x | x | Comparative sample |
| I-11 | 30 | 125 | — | ○ | x | Comparative sample |
| I-12 | 30 | 65 | 48 | ○ | x | Comparative sample |
| I-13 | 30 | 50 | 60 | ○ | ○ | Sample of the Invention |

Samples I-1 to I-10 demonstrated examples of an NDCA/TPM/EG copolymer system. Samples I-1 to I-6 had a Tg of higher than 90° C. Samples I-3 and I-6 displayed a significant uncurling effect after they were heat-treated and stretched under the condition of having the indicated temperature difference between the two surfaces of the film. Because of this effect, the samples were free from troubles in development.

As opposed to them, Samples I-7 to I-10 were quite ineffective even after they were heat-treated and stretched by the method of the present invention, as they had a Tg of lower than 90° C.

Samples I-11 to I-13 demonstrated examples of a TPM/EG/CHDM/BPA copolymer system. As these samples had a Tg of higher than 90° C., one of them (see Sample I-13) displayed a significant uncurling effect after it was heat-treated and stretched by the method of the present invention.

As is noted from the above-mentioned results, a polyester film having a glass transition temperature of not lower than 90° C. is hardly curled when it is heat-treated at a temperature not higher than its glass transition temperature and stretched under the condition of having temperature difference between the two surfaces of the film.

Specifically, it is understood from the results of Examples 1 to 6 that the present invention provides a silver halide photographic material which is hardly curled and which has strong mechanical properties.

While the invention has been described in detail and with reference to specific embodiments thereof, it will be apparent to one skilled in the art that various changes and modifications can be made therein without departing from the spirit and scope thereof.

What is claimed is:

1. A silver halide photographic material having at least one light-sensitive layer on a polyester film support, in which the polyester film support has a glass transition point of from 90° C. to 200° C. and has been heat-treated between 0.1 hour and 1500 hours at a temperature of from 50° C. to its glass transition point; wherein the polyester film support has a thickness of from 50 μm to 300 μm; and wherein the material is in the form of a roll film wound around a spool having a diameter of from 3 mm to 10 mm; wherein the polyester of the film has been prepared from a dicarboxylic acid portion which is at least 30 mol % naphthalenedicarboxylic acid.

2. The silver halide photographic material as in claim 1, in which the polyester film support is made of a polyester containing naphthalene-dicarboxylic acid and ethylene glycol.

3. The silver halide photographic material as in claim 2, in which the polyester containing naphthalene-dicarboxylic acid and ethylene glycol is a polyethylene-2,6-naphthalate.

4. The silver halide photographic material as in claim 1, in which the polyester of the polyester film support contains naphthalene-dicarboxylic acid and terephthalic acid in a molar ratio from 0.3/0.7 to less than 1.0/0.

5. The silver halide photographic material as in claim 1, in which the polyester of the polyester film support contains polyethylene naphthalate and polyethylene terephthalate in a molar ratio from 0.3/0.7 to less than 1.0/0.

6. The silver halide photographic material as in claim 1, which contains an ultraviolet absorbent.

7. The silver halide photographic material as in claim 1, wherein the polyester film support has a first and a second surface and is formed by stretching, wherein the first surface has a stretching temperature that differs from that of the second surface.

8. The silver halide photographic material as in claim 7, wherein the stretching temperature differs between the first and second surfaces of the polyester film support by from 10° C. to 100° C.

9. The silver halide photographic material as in claim 7, prior to forming the polyester film support, the polyester forming the support is heated whereby the first surface has a heated temperature that differs from that of the second surface.

10. The silver halide photographic material as in claim 9, wherein the stretching temperature differs between the first and the second surfaces of the polyester film support by from 10° C. to 100° C.

11. The silver halide photographic material as in claim 7, in which the polyester film support is made of a polyester containing naphthalene-dicarboxylic acid and ethylene glycol.

12. The silver halide photographic material as in claim 11, in which the polyester containing naphthalene-dicarboxylic acid and ethylene glycol is a polyethylene-2,6-naphthalate.

13. The silver halide photographic material as in claim 7, in which the polyester of the polyester film support contains naphthalene-dicarboxylic acid and terephthalic acid in a molar ratio from 0.3/0.7 to less than 1.0/0.

14. The silver halide photographic material as in claim 7, in which the polyester of the polyester film support contains polyethylene naphthalate and polyethylene terephthalate in a molar ratio from 0.3/0.7 to less than 1.0/0.

15. The silver halide photographic material as in claim 7, which contains an ultraviolet absorbent.

\* \* \* \* \*